(12) United States Patent
Takahashi et al.

(10) Patent No.: US 10,910,974 B2
(45) Date of Patent: Feb. 2, 2021

(54) CONTROL DEVICE FOR AC MOTOR

(71) Applicant: DENSO CORPORATION, Kariya (JP)

(72) Inventors: Hidekazu Takahashi, Kariya (JP); Koji Irie, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/520,659

(22) Filed: Jul. 24, 2019

(65) Prior Publication Data

US 2019/0348938 A1 Nov. 14, 2019

Related U.S. Application Data

(63) Continuation of application No. PCT/JP2018/001150, filed on Jan. 17, 2018.

(30) Foreign Application Priority Data

Jan. 24, 2017 (JP) ................................ 2017-010058

(51) Int. Cl.
| | |
|---|---|
| *H02P 11/06* | (2006.01) |
| *H02P 29/40* | (2016.01) |
| *H02P 4/00* | (2006.01) |
| *H02P 21/34* | (2016.01) |

(52) U.S. Cl.
CPC ............... *H02P 11/06* (2013.01); *H02P 4/00* (2013.01); *H02P 29/40* (2016.02); *H02P 21/34* (2016.02)

(58) Field of Classification Search
CPC ............. H02P 11/06; H02P 4/00; H02P 29/40
USPC ................................ 318/400.04, 400.01, 700
See application file for complete search history.

(56) References Cited

U.S. PATENT DOCUMENTS

| | | | |
|---|---|---|---|
| 5,883,484 A * | 3/1999 | Akao ....................... | H02P 6/08 |
| | | | 318/700 |
| 7,952,309 B2 * | 5/2011 | Nishimura ............ | B60L 15/025 |
| | | | 318/400.24 |
| 9,077,269 B2 * | 7/2015 | Nakamura ................ | H02P 6/10 |
| 2012/0173066 A1 | 7/2012 | Yamada et al. | |

* cited by examiner

*Primary Examiner* — David Luo
(74) *Attorney, Agent, or Firm* — Oliff PLC

(57) ABSTRACT

A feedback control switching unit of an inverter control unit selects, based on a magnitude relationship between a predetermined switching determination amount and at least one switching threshold, at least one of feedback control units to thereby execute switching among feedback control modes, such as a current feedback control mode and a torque feedback control mode, of the respective feedback control units for driving of the AC motor. A switching command generating unit generates a switching command for an inverter based on a manipulated variable calculated by the selected feedback control unit. When a torque response request determining unit determines that a required torque responsiveness is high, the feedback control switching unit reduces the number of executions of switching among the feedback control modes.

15 Claims, 22 Drawing Sheets

CURRENT RANGE

FIG.8
CURRENT FB
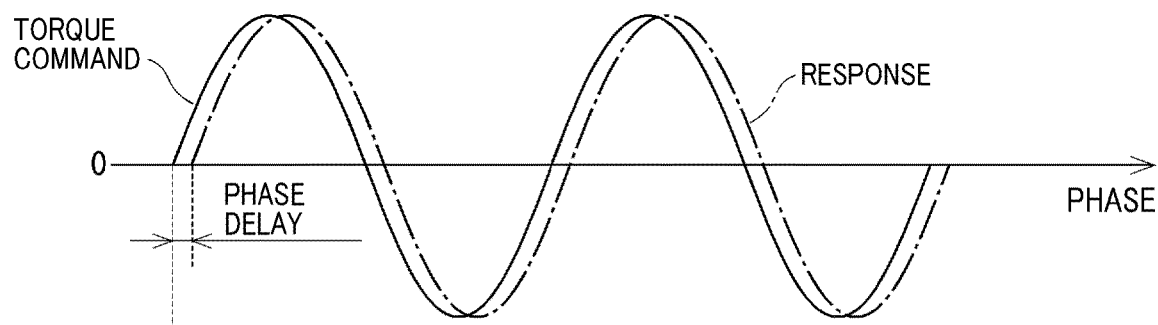
TORQUE FB
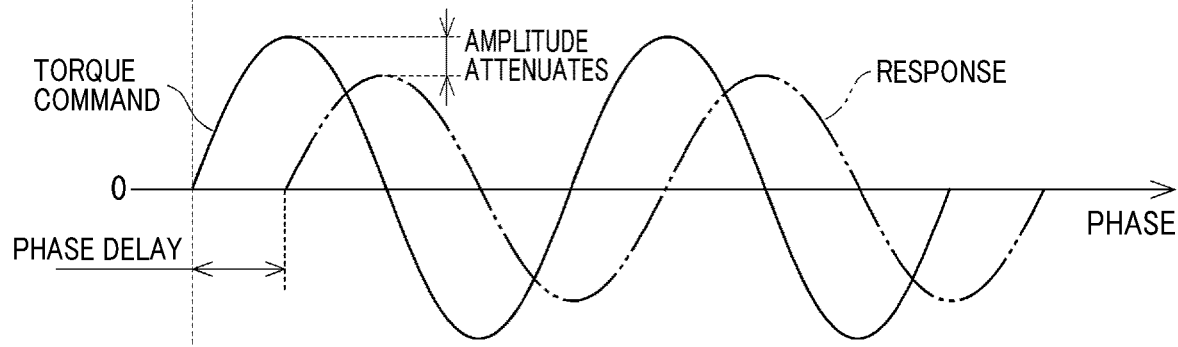
SWITCHING BETWEEN CURRENT FB AND TORQUE FB
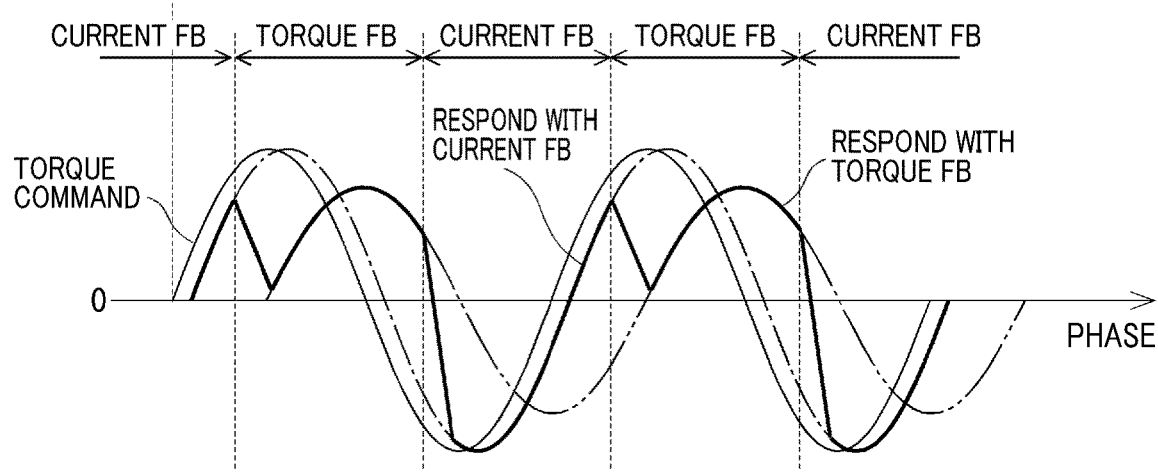

FIG.9
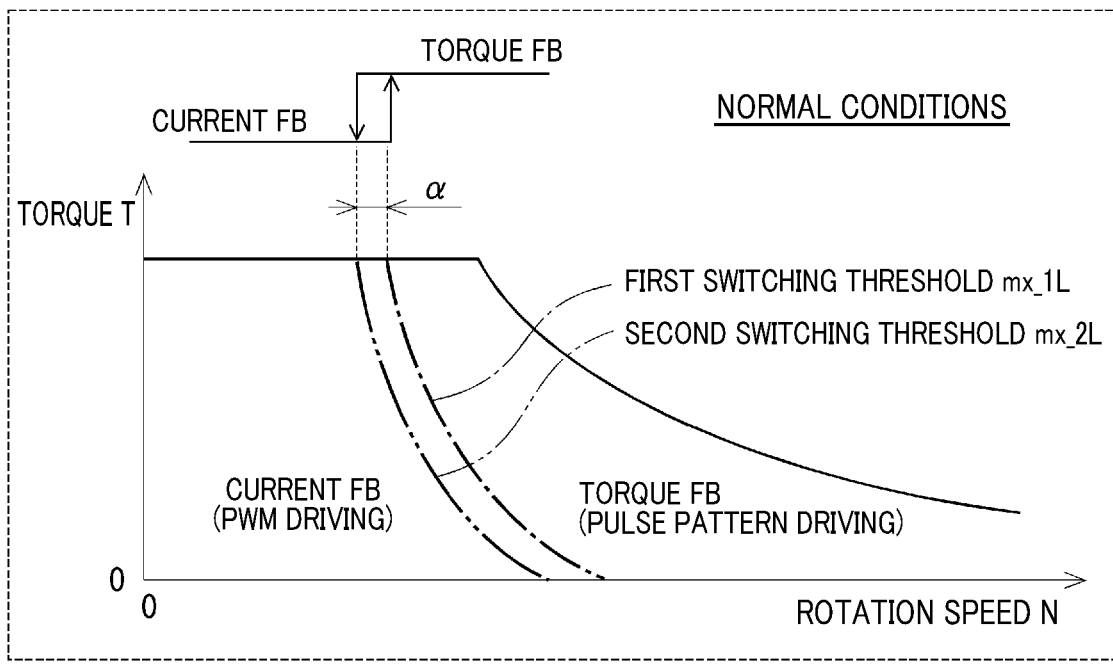
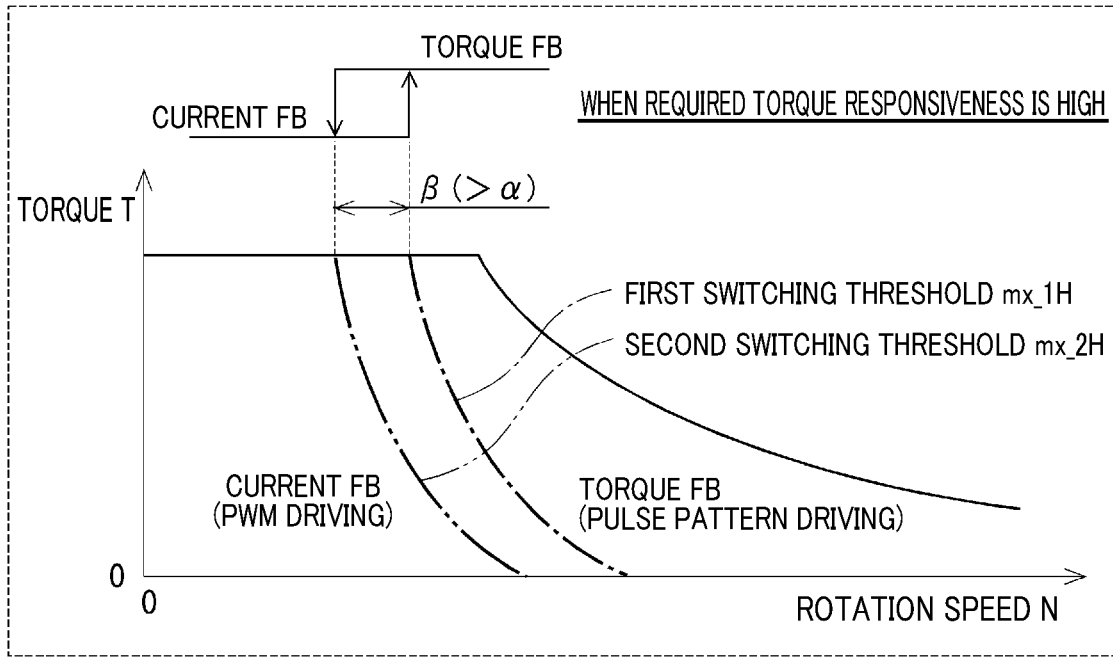

FIG.13
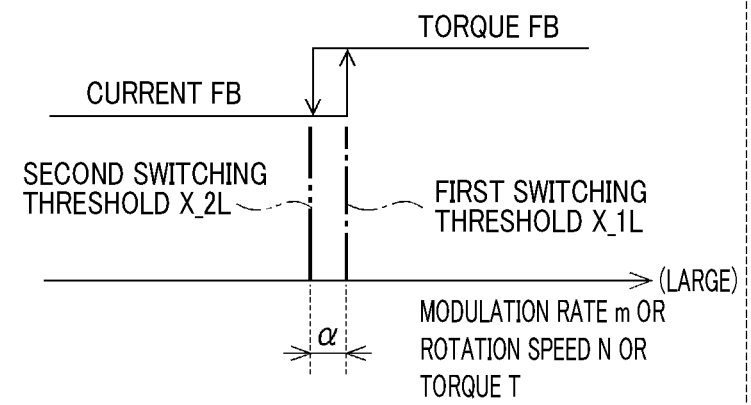
NORMAL CONDITIONS
⇩ EXTEND HYSTERESIS WIDTH
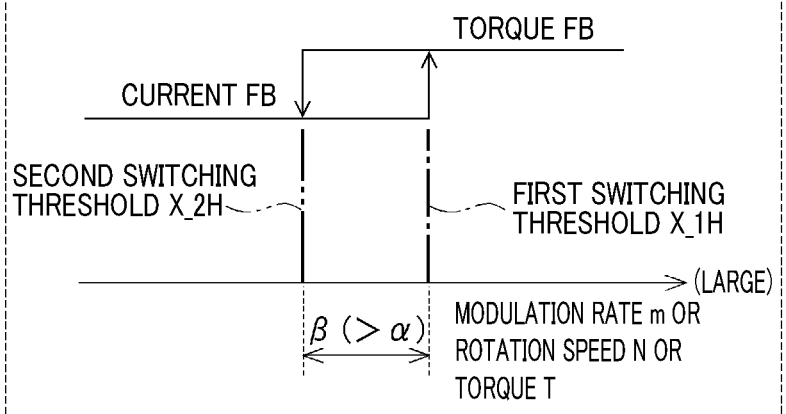
WHEN REQUIRED TORQUE RESPONSIVENESS IS HIGH

FIG.14
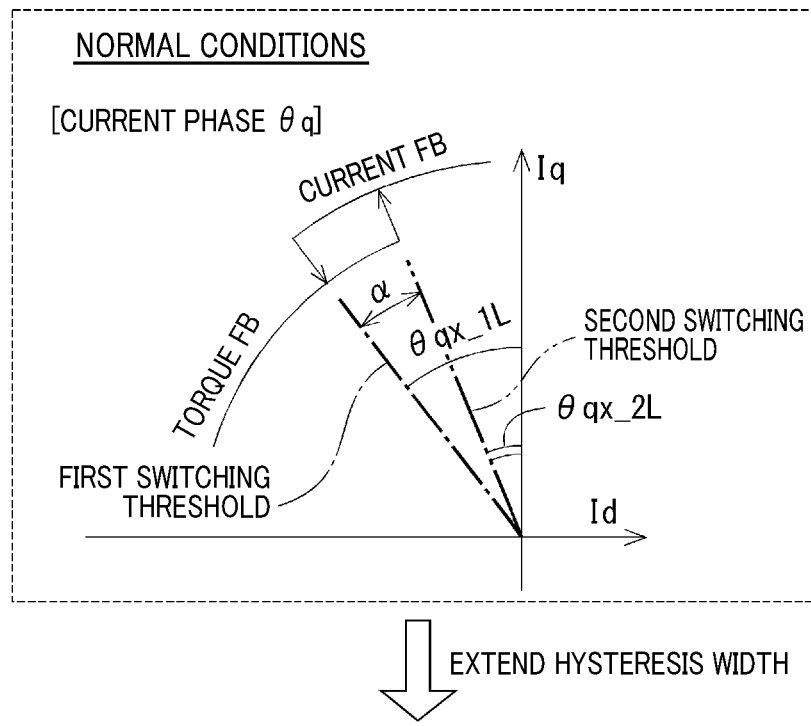
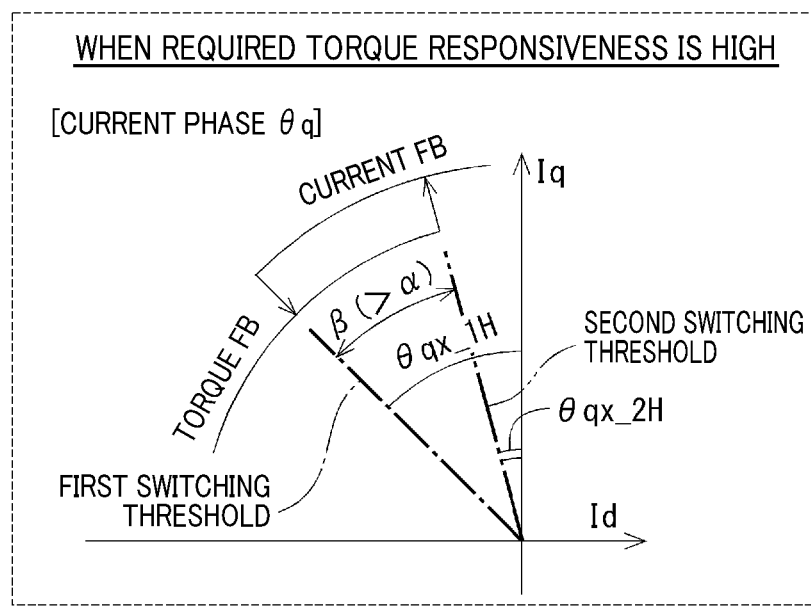

FIG.19
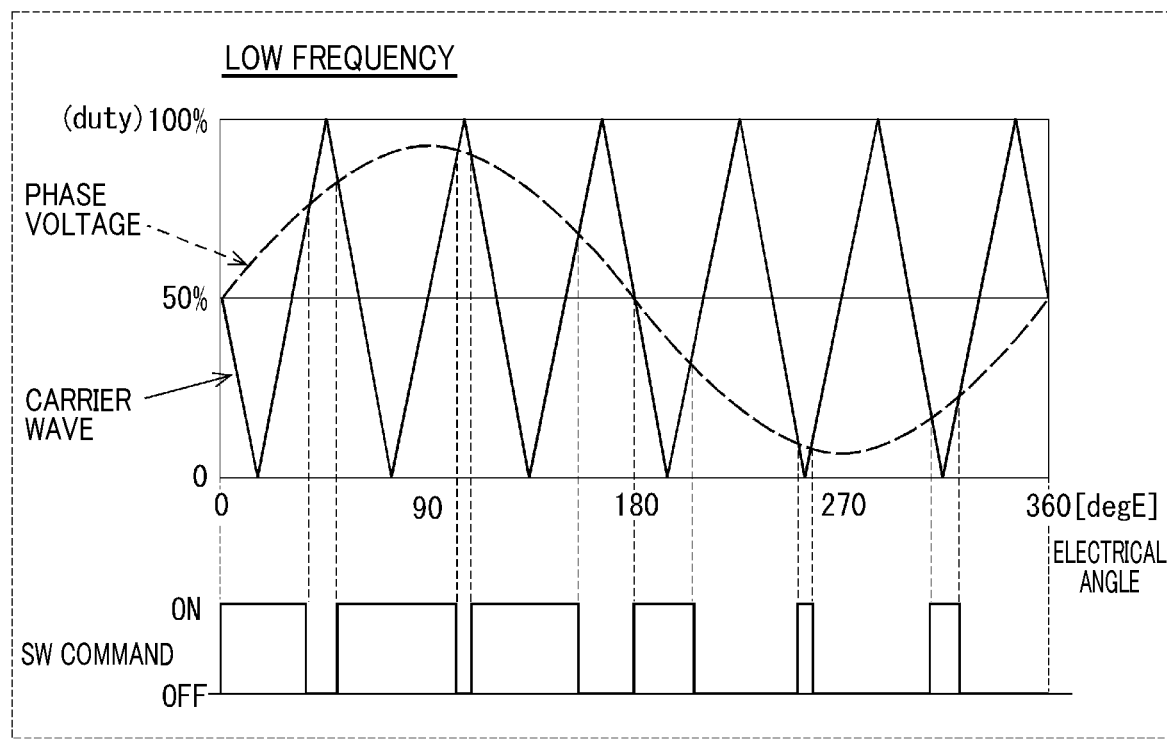
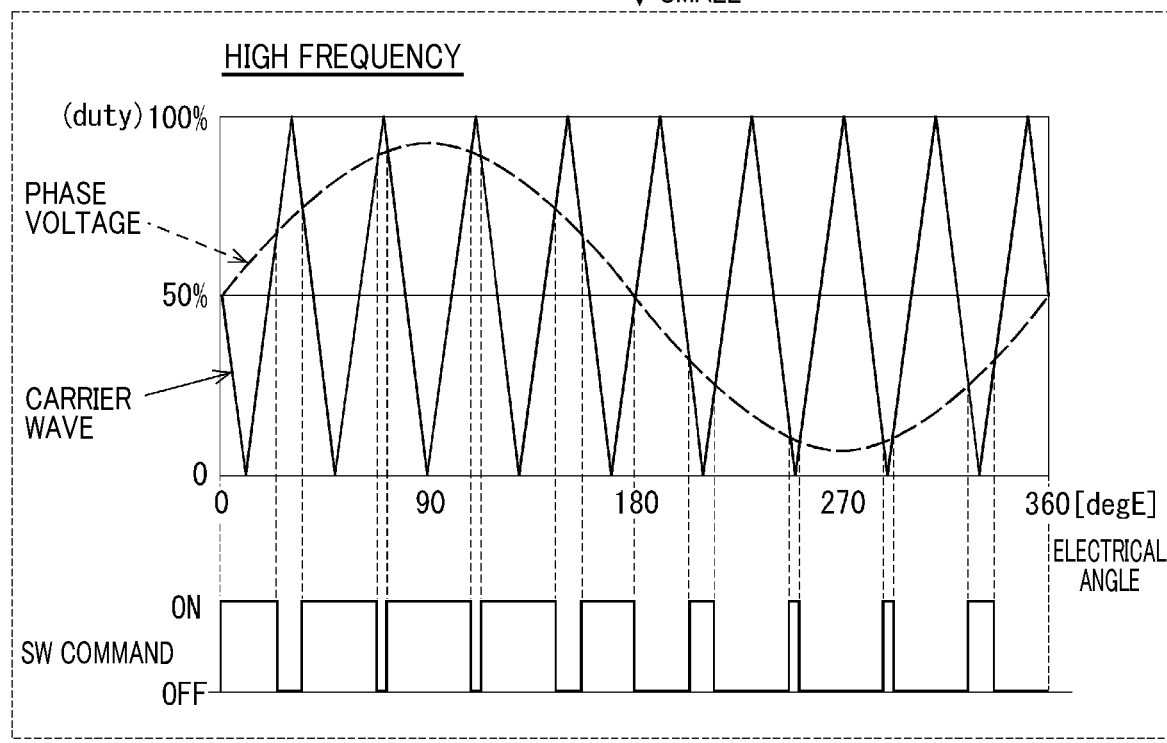

FIG.20
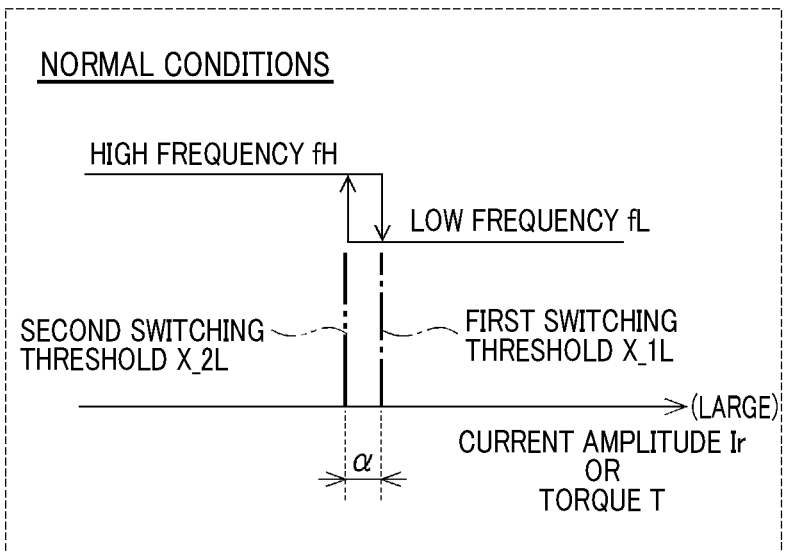
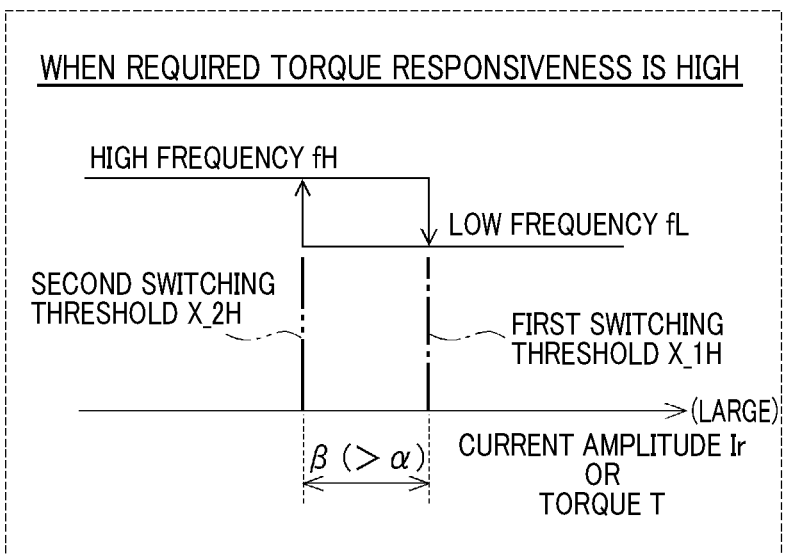

CONTROL DEVICE FOR AC MOTOR

CROSS-REFERENCE TO RELATED APPLICATION

The present application is a continuation application of International Application No. PCT/JP2018/001150, filed on Jan. 17, 2018, which claims priority to Japanese Patent Application No. 2017-10058 filed on Jan. 24, 2017. The contents of these applications are incorporated herein by reference in their entirety.

BACKGROUND

Technical Field

The present disclosure related to a control device for an AC motor.

Background Art

A system includes a booster converter and an inverter, and can select an inverter control mode between a first control mode and a second control mode.

SUMMARY

A control device for an AC motor according to the present disclosure includes a plurality of feedback control units, a feedback control switching unit, and a torque response request determining unit. The feedback control switching unit selects, based on a magnitude relationship between a predetermined switching determination amount and at least one switching threshold, at least one of the feedback control units to thereby execute switching among the feedback control modes of the respective feedback control units for driving of the AC motor. When the torque response request determining unit determines that the required torque responsiveness is high, the feedback control switching unit reduces the number of executions of switching among the feedback control modes.

BRIEF DESCRIPTION OF THE DRAWINGS

The above-described and other objects, features, and advantages of the present disclosure will be more apparent from the following detailed description with reference to the accompanying drawings.

FIG. 8 is a diagram illustrating a decrease in torque responsiveness associated with switching for feedback control.

FIG. 9 is an N-T characteristic diagram illustrating an increase in hysteresis width in feedback control switching.

FIG. 13 is a diagram illustrating an increase in hysteresis width in feedback control switching based on the modulation rate, the rotation speed, and the torque.

FIG. 14 is a diagram illustrating an increase in hysteresis width in feedback control switching based on the current phase.

FIG. 19 is a diagram illustrating a relationship between a carrier wave frequency and a switching count during one electric angle period.

FIG. 20 is a diagram illustrating an increase in hysteresis width in carrier wave frequency switching.

DETAILED DESCRIPTION OF THE PREFERRED EMBODIMENTS

Figure 1:
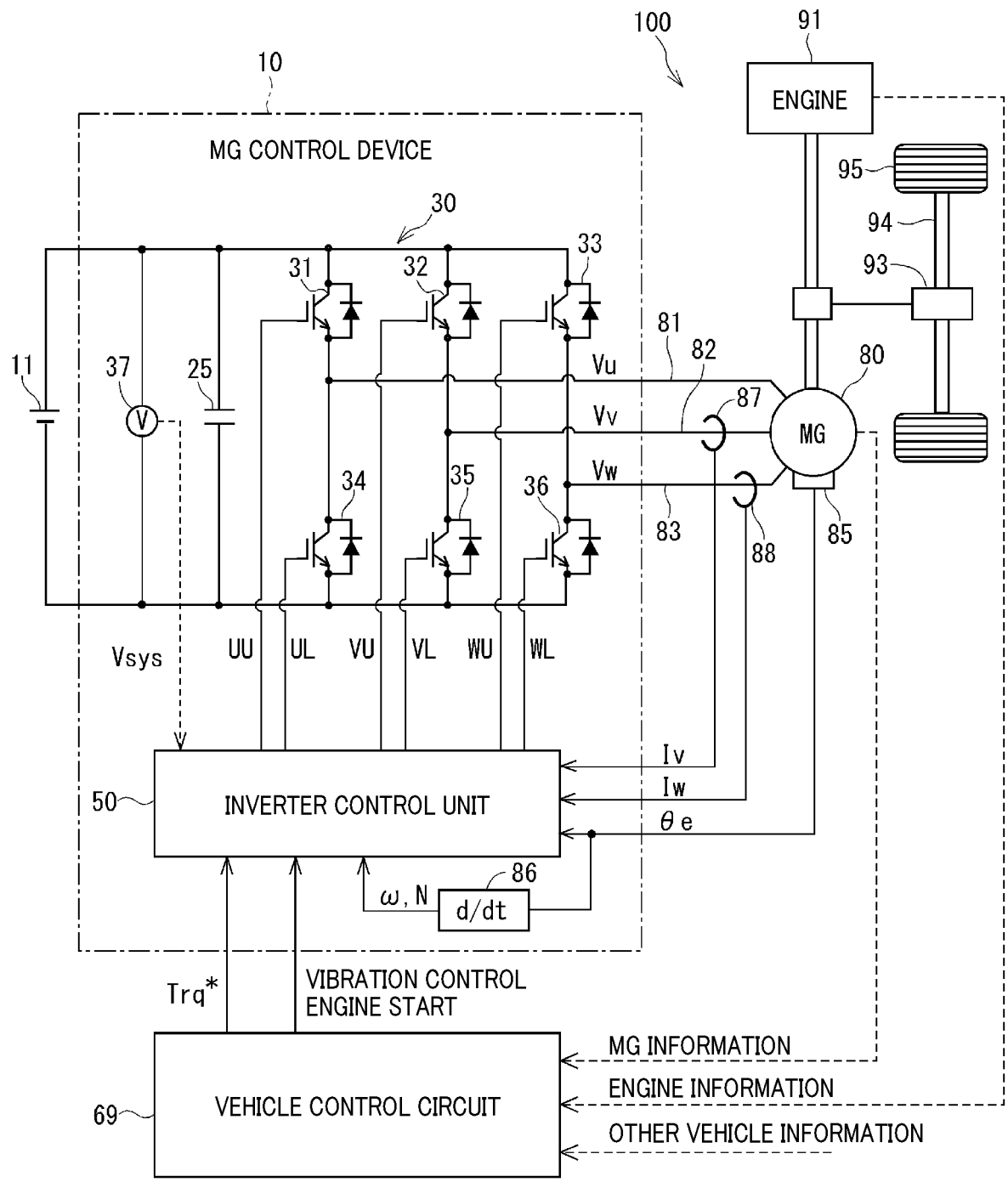
FIG. 1 is a schematic diagram of the configuration of a vehicle system to which a control device for an AC motor according to each embodiment is applied.

Techniques for improving torque responsiveness in control of AC motors are known.

For example, PTL 1 discloses a system that includes a booster converter and an inverter, that can select the inverter control mode between the first control mode applied when a modulation rate for power conversion is low and the second control mode applied when the modulation rate is high. The system selects the first control mode when the torque responsiveness required for the AC motor is high and selects the second control mode when the required torque responsiveness is not high.

[PTL 1] JP-B-5297953

The related art simply indicates that the second mode is advantageous for reducing power loss but involves low torque responsiveness, and in a case where priority is given to improved torque responsiveness over reduced power loss, the second control mode is switched to the first control mode. However, the inventors have found that, in a case where switching of the control mode frequently occurs even though each one of a plurality of control modes satisfies high torque responsiveness, the torque responsiveness becomes significantly lower than the responsiveness in each control mode. This is assumed to be also applied to switching of a carrier wave frequency in PWM control. The related art makes no reference to a decrease in torque responsiveness accompanying the switching of the control mode and/or the carrier wave frequency.

Furthermore, the related art is premised on a system including a boost converter and fails to be applied to a system with no boost converter.

An object of the present disclosure is to provide a control device for an AC motor that improves the torque responsiveness.

A control device for an AC motor according to a first aspect of the present disclosure includes an inverter, a plurality of feedback control units, a feedback control switching unit, a switching command generating unit, and a torque response request determining unit. The inverter includes a plurality of switching elements that convert DC power input from a power supply into AC power and supply the AC power to the AC motor. The plurality of feedback control units respectively perform feedback control modes that respectively use feedback of different controlled variables for driving of the AC motor. The feedback control switching unit selects, based on a magnitude relationship between a predetermined switching determination amount and at least one switching threshold, at least one of the feedback control units to thereby execute switching among the feedback control modes of the respective feedback control units for driving of the AC motor.

The switching command generating unit generates a switching command for the inverter based on a manipulated variable calculated by the selected feedback control unit. The torque response request determining unit determines a degree of torque responsiveness required for the AC motor. When the torque response request determining unit determines that the required torque responsiveness is high, the feedback control switching unit reduces the number of executions of switching among the feedback control modes.

Specifically, the plurality of feedback control units include a current feedback control unit and a torque feedback control unit. The current feedback control unit calculates an output voltage from the inverter as the manipulated variable of the corresponding feedback control modes for a current flowing through the AC motor. The torque feedback control unit calculates a phase of an output voltage from the inverter as the manipulated variable of the corresponding feedback control modes for torque output from the AC motor. The feedback control switching unit selects one or both of the current feedback control unit and the torque feedback control unit.

In a first aspect of the present disclosure, when the required torque responsiveness is determined to be high, the number of executions of switching of the feedback control is reduced to allow suppression of a decrease in torque responsiveness associated with switching of the feedback control. Accordingly, the torque responsiveness can be improved.

As a configuration for a reduction in switching frequency, the following two configurations may mostly be used.
(1) In a configuration with switching hysteresis, a hysteresis width is increased.
(2) One switching among the feedback control modes is executed, and thereafter next execution of switching among the feedback control modes is prohibited for a predetermined switching prohibition period.

Furthermore, in contrast to the related art, the first aspect of the present disclosure can also be applied to a system with no boost converter.

A control device for an AC motor according to a second aspect of the present disclosure includes an inverter, a carrier wave generator, a carrier wave frequency switching unit, a switching command generating unit, and a torque response request determining unit. The inverter includes a plurality of switching elements that convert DC power input from a power supply into AC power and supply the AC power to the AC motor. The carrier wave generator can generate a plurality of carrier waves with different frequencies. The carrier wave frequency switching unit executes switching among the frequencies of the respective carrier waves based on a magnitude relationship between a predetermined switching determination amount and a switching threshold.

The switching command generating unit performs PWM control in which the carrier wave generated by the carrier wave generator is compared with a command voltage, to thereby generate a switching command for the inverter. The torque response request determining unit determines a degree of torque responsiveness required for the AC motor. When the torque response request determining unit determines the required torque responsiveness to be high, the carrier wave frequency switching unit reduces the number of executions of switching among the frequencies of the respective carrier waves.

In a second aspect of the present disclosure, when the required torque responsiveness is determined to be high, the number of executions of switching among the frequencies of the respective carrier waves is reduced to allow suppression of a decrease in torque responsiveness associated with switching among the frequencies of the respective carrier waves. This allows the torque responsiveness to be improved.

A plurality of embodiments of a control device for an AC motor will be described below based on the drawings. In the plurality of embodiments, substantially the same components are denoted by the same reference signs and will not be described below. Furthermore, a first to a fourth embodiments are collectively referred to as the "present embodiment".

The control device for the AC motor in the present embodiment is used in a system driving a motor generator (hereinafter referred to as an "MG") serving as a power source for a hybrid car or an electric car, and controls electric conduction through the MG that is a three-phase AC motor. The "MG" and an "MG control device" in each embodiment correspond to the "AC motor" and the "control device for the AC motor".

"System Configuration"

First, a general configuration of a vehicle system to which the MG control device in each embodiment is applied will be described with reference to FIG. 1. FIG. 1 illustrates a vehicle system 100 for a hybrid vehicle including an engine 91 and an MG 80 as a power source for a vehicle. In the vehicle system 100, a vehicle control device 69 acquires engine information and MG information related to an operating state of the engine 91 and the MG 80. Furthermore, the vehicle control device 69 acquires information related to a driving state of the vehicle, such as an accelerator signal, a brake signal, a shift signal, and a vehicle speed signal. The vehicle control circuit 69 integrally controls each piece of equipment of the vehicle based on these pieces of information. In particular, in the present embodiment, the vehicle control circuit 69 issues a torque command Trq* to an inverter control unit 50 of the MG control device 10, and also notifies the inverter control unit 50 of information about vibration control and/or engine start.

The MG 80 is, for example, a permanent-magnet-type, synchronous three-phase AC motor. In the present embodiment, the MG 80 is mounted in a hybrid car 100 including the engine 91. The MG 80 functions both as an electric motor generating torque that drives drive wheels 95 and as a generator recovering energy of torque transmitted from the engine 91 and the drive wheels 95 by power generation. The MG 80 is connected to an axle 94 via gears 93 of, for example, a transmission. Torque generated by the MG 80 rotates the axle 94 via the gear 93 to drive the drive wheels 95.

Current sensors detecting phase currents are provided on current paths connected to two-phase windings of three-phase windings 81, 82, 83 of the MG 80. In an example in FIG. 1, current sensors 87, 88 respectively detecting phase currents Iv, Iw are provided on current paths respectively connected to a V-phase winding 82 and a W-phase winding 83, and a remaining U-phase current Iu is estimated based on Kirchhoff's law. In the other embodiments, any two-phase currents may be detected or three-phase currents may be detected. Alternatively, a technique for estimating, based on a one-phase current detected value, other two-phase currents may be employed.

An electrical angle $\theta e$ of the MG 80 is detected by a rotation angle sensor 85, for example, a resolver or the like.

A battery 11 used as a "power supply" is a chargeable and dischargeable secondary battery. An inverter 30 converts DC power input from the battery 11 into three-phase AC power, and supplies the three-phase AC power to the MG 80. A boost converter may be provided that boosts the voltage of the battery 11 and outputs the boosted voltage to the inverter 30.

The inverter 30 includes six upper- and lower-arm switching elements 31 to 36 connected in bridge configuration. Specifically, the switching elements 31, 32, and 33 respectively serve as U-, V-, and W-phase upper-arm switching elements, and the switching elements 34, 35, and 36 respectively serve as U-, V-, and W-phase lower-arm switching elements.

Each of the switching elements 31 to 36 is comprised of, for example, an IGBT, and a flyback diode connected in parallel to the IGBT; the flyback diode enables a current to flow from a lower side of the IGBT to a higher side thereof.

In the inverter 30, the switching elements 31 to 36 operate in accordance with gate signals UU, UL, VU, VL, WU, WL from the inverter control unit 50 to convert DC power into three-phase AC power. The inverter 30 then respectively applies, to each of the phase windings 81, 82, 83 of the MG 80, phase voltages Vu, Vv, Vw corresponding to a command voltage calculated by the inverter control unit 50. A smoothing capacitor 25 smooths a system voltage Vsys input to the inverter 30. A voltage sensor 37 detects the system voltage Vsys.

The inverter control unit 50 is constituted of a microcomputer or the like, and includes a CPU, a ROM, an I/O, and a bus line connecting these components; the CPU, the ROM, the I/O, and the bus line are not illustrated in the drawings. The microcomputer executes control based on software processing implemented by the CPU executing a prestored program and/or control based on hardware processing implemented by a dedicated electronic circuit. The inverter control unit 50 acquires the system voltage Vsys, the two-phase phase currents Iv, Iw, and the electrical angle $\theta e$ detected by each sensor. Furthermore, the inverter control unit 50 acquires an angular velocity $\omega$ [deg/s] obtained by time-differentiating the electrical angle $\theta e$ by a differentiator 86, and a rotation speed N [rpm] obtained by converting the angular velocity $\omega$. The inverter control unit 50 may include a differentiator 86.

The inverter control unit 50 further receives the torque command Trq* from the vehicle control device 69, and based on these pieces of information, calculates the gate signals UU, UL, VU, VL, WU, WL operating the inverter 30. In the inverter 30, the switching elements 31 to 36 operate in accordance with the gate signals UU, UL, VU, VL, WU, WL to convert DC power input from the battery 11 into AC power, and supplies the AC power to the MG 80.

[Configuration of Inverter Control Unit]

Figure 2:
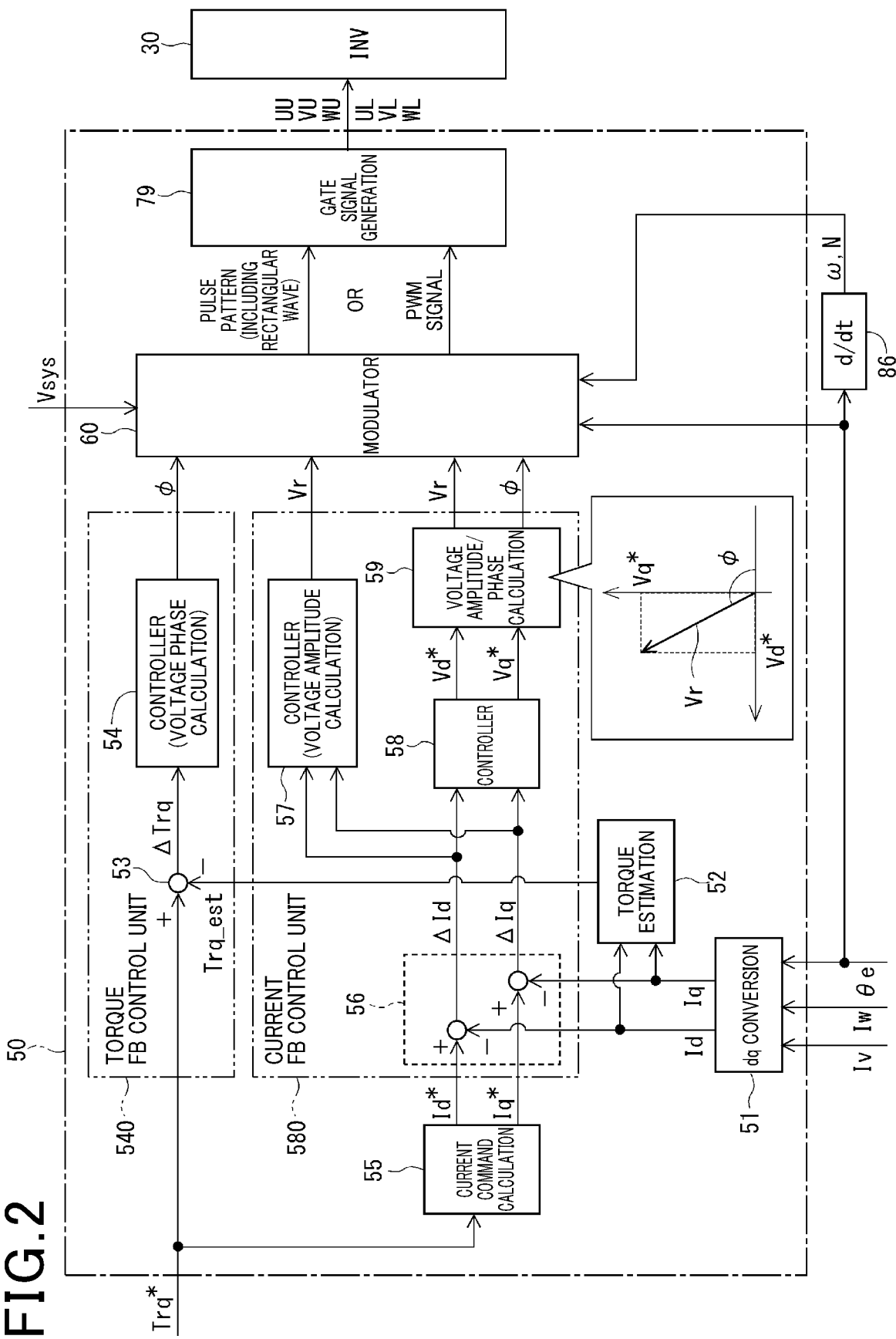
FIG. 2 is a control block diagram of an inverter control unit of each embodiment.

A configuration of the inverter control unit 50 will be described with reference to FIG. 2. The inverter control unit 50 in the present embodiment includes a current feedback control unit 580 and a torque feedback control unit 540 as "a plurality of feedback control units respectively perform feedback control modes that respectively use feedback of different controlled variables for driving of the MG 80". In the drawings, the "feedback control units" are represented as "FB CONTROL UNITS".

The current feedback control unit 580 calculates an output voltage from the inverter 30 as the manipulated variable of the corresponding feedback control modes of a current flowing through the MG 80. In the current feedback control, typically, the inverter 30 is operated by PWM driving that uses an output voltage waveform generated by comparing a carrier wave with a command voltage. The torque feedback control unit 540 calculates a phase of an output voltage from the inverter 30 as the manipulated variable of the corresponding feedback control modes of torque output by the MG 80. In the torque feedback control, typically, the inverter 30 is operated by pulse pattern driving that uses an output voltage waveform selected from a plurality of prestored patterns. The pulse patterns include a pattern in which one rectangular pulse is output during one electrical cycle.

In the first to third embodiments below, based on a magnitude relationship between a predetermined switching determination amount and a switching threshold, switching takes place between current feedback control provided by the current feedback control unit 580 and torque feedback control provided by the torque feedback control unit 540. The first and second embodiments involve switching between two modes including a mode using the current feedback control unit 580 and a mode using the torque feedback control unit 540. The third embodiment involves switching among three modes further including a mode using both the current feedback control unit 580 and the torque feedback control unit 540. On the other hand, a fourth embodiment is premised on PWM driving and involves switching of a carrier wave frequency based on the magnitude relationship between a predetermined switching determination amount and a switching threshold.

Here, an overview of the embodiments will be presented, and a general configuration of the inverter control unit 50 will be described. The current feedback control unit 580 includes a current subtractor 56, a controller 57, a controller 58, and a voltage amplitude/phase calculating unit 59. The controller 57, the controller 58, and the voltage amplitude/phase calculating unit 59 may be selectively provided according to the configuration of the feedback control unit. The torque feedback control unit 540 includes a torque subtractor 53 and a controller 54. Besides, the inverter control unit 50 includes a dq converting unit 51, a torque estimating unit 52, a current command calculating unit 55, a modulator 60, and a gate signal generating unit 79.

First, in both types of feedback control, the dq converting unit 51 converts phase currents acquired from the current sensors 87, 88 into dq-axis currents Id, Iq based on the electrical angle $\theta e$. In the current feedback control, based on the torque command Trq*, the current command calculating unit 55 uses a map or a numerical expression to calculate dq-axis commands Id*, Iq* so as to, for example, obtain the maximum torque per current. The current subtractor 56 calculates current deviations ΔId, ΔIq between the dq-axis commands Id*, Iq* and dq-axis currents Id, Iq fed back from the dq converting unit 51.

In a configuration in which the current feedback control unit 580 calculates an amplitude Vr and a phase φ of an output voltage, the controller 58 performs a PI operation to calculate dq-axis command voltages Vd*, Vq* so as to make the current deviations ΔId, ΔId converge to 0. The voltage amplitude/phase calculating unit 59 converts dq-axis command voltages Vd*, Vq* into the voltage amplitude Vr and the voltage phase φ, and outputs the voltage amplitude Vr and the voltage phase φ to the modulator 60. In FIG. 2, the voltage phase φ is indicated based on a d axis. However, the voltage phase φ may be defined based on a q axis. The modulator 60 receives information such as the system voltage Vsys, the electrical angle θe, an angular velocity ω, and a rotational frequency N, in addition to the voltage amplitude Vr and the voltage phase φ. Based on these pieces of information, the modulator 60 generates an output voltage waveform used to operate the inverter 30.

In the torque feedback control, the torque estimating unit 52 uses Equation (1) to calculate a torque estimated value Trq_est based on the dq-axis currents Id, Iq and a motor constant for the MG 80. In a system in which the MG 80 includes a torque sensor, the torque estimating unit 52 may be omitted and a torque detected value may be acquired.

$$Trq\_est = p \times \{Iq \times \Psi + (Ld-Lq) \times Id \times Iq\} \quad (1)$$

In the equation,
p: the number of pole pairs of the MG
Ψ: back electromotive force constant
Ld, Ld: d-axis inductance, q-axis inductance The torque subtractor 53 calculates a torque deviation ΔTrq between the torque command Trq* and the torque estimated value Trq_est. The controller 54 performs the PI operation to calculate the voltage phase φ so as to make the torque deviation ΔTrq converge to 0, and outputs the voltage phase φ to the modulator 60. In the torque feedback control for driving of the MG 80 using a rectangular wave voltage, the modulator 60 generates an output voltage waveform of the rectangular wave based on the voltage phase φ calculated by the controller 54.

Furthermore, in a control mode using both the current feedback control unit 580 and the torque feedback control unit 540, the controller 57 of the current feedback control unit 580 performs the PI operation to calculate the voltage amplitude Vr so as to make the current deviations ΔId, ΔIq converge to 0, and outputs the voltage amplitude Vr to the modulator 60. Based on the voltage amplitude Vr calculated by the controller 57 of the current feedback control unit 580 and the voltage phase φ calculated by the controller 54 of the torque feedback control unit 540, the modulator 60 generates an output voltage waveform of a pulse pattern other than the rectangular wave which pattern is used in a overmodulation region or the like.

A detailed configuration of the modulator 60 will be described separately for the first to third embodiments and for the fourth embodiment. The modulator in the first to third embodiments is denoted by reference numeral "601", and the modulator in the fourth embodiment is denoted by reference numeral "604". Now, each embodiment will be described.

First Embodiment

The first embodiment will be described with reference to FIGS. 3 to 14. First, with reference to FIG. 3, a configuration of a modulator 610 common to the first to third embodiments will be described. The modulator 601 includes a modulation rate calculating unit 61, a feedback (in the drawings, "FB") control switching unit 62, a switching (in the drawings, "SW") command generating unit 65, and a torque response request determining unit 68. Based on the voltage amplitude Vr and the system voltage Vsys, the modulation rate calculating unit 61 calculates a modulation rate m using Equation (2).

$$m = 2\sqrt{(2/3)} \times (Vr/Vsys) \quad (2)$$

Besides the voltage amplitude Vr and the system voltage Vsys, the feedback control switching unit 62 receives at least one of the pieces of information of the modulation rate m of the inverter 30, the rotational frequency N of the MG 80, torque T, or a current phase θq of a current flowing through the MG 80 as a switching determination amount. Here, the torque T may be either the torque command Trq* or the detected value or estimated value of actual torque. For example, in a case where the modulator 60 is used to set the upper limit of the voltage amplitude Vr, switching determination is effectively made based on the pieces of information including the rotation speed N, the torque T, and the current phase θq instead of or in addition to the modulation rate m because switching determination fails to be achieved simply by using the modulation rate m. The switching determination amount may be, instead of the rotation speed N, the angular velocity ω, which is proportional to the rotation speed N, the rotation speed of the axle, which is correlated with the MG rotation speed, or the like. Furthermore, instead of the torque T and the current phase θq, an amount related to the torque or an amount related to the current amplitude or phase may be used.

Furthermore, the feedback control switching unit 62 internally stores switching thresholds for each of switching determination amounts or acquires the switching thresholds from an external storage device. The feedback control switching unit 62 then selects, based on the magnitude relationship between the switching determination amount and at least one switching threshold, one or both of the current feedback control unit 580 and the torque feedback control unit 540 to thereby execute switching among the feedback control modes of the respective feedback control units for driving of the MG 80. As described above, the first and second embodiments involves switching between two modes including a mode using the current feedback control unit 580 and a mode using the torque feedback control unit 540. The third embodiment involves switching among three modes further including a mode using both the current feedback control unit 580 and the torque feedback control unit 540.

The switching command generating unit 65 generates switching commands Su, Sv, Sw for the inverter 30 based on the manipulated variable calculated by the feedback control unit selected by the feedback control switching unit 62, and outputs the switching commands Su, Sv, Sw to the gate signal generating unit 79. Specifically, selection of the torque feedback control unit 540 causes the switching command generating unit 65 to generate a rectangular wave signal, which is one of the pulse patterns, as a switching command. Furthermore, selection of the current feedback control unit 580 causes the switching command generating unit 65 to generate a PWM signal as a switching command based on a comparison between a carrier wave and a command voltage. The switching command generating unit 65 acquires information about the electrical angle θe and the rotation speed N in order to generate switching commands.

The gate signal generating unit 79 generates gate signals UU, UL, VU, VL, WU, WL based on the switching commands Su, Sv, Sw, and outputs the gate signals UU, UL, VU, VL, WU, WL to the switching elements 31 to 36 of the inverter 30. Thus, the inverter 30 is driven by the feedback control of the inverter control unit 50.

Now, before description of the torque response request determining unit 68, an outline of the two-mode feedback control switching will be presented with reference to FIGS. 4 to 6C. The description of this portion does not refer to hysteresis of control switching that is a configuration specific to the first embodiment. In a rotation speed-torque characteristic (hereinafter referred to as "N-T" characteristic) diagram in FIG. 4, a modulation rate mx of the switching threshold is indicated by a dashed line. In a low rotation speed region where the modulation rate m is lower than the switching threshold mx, the inverter 30 is PWM-driven under the current feedback control. In a high rotation speed N region where the modulation rate m is higher than the switching threshold mx, the inverter 30 is pulse-pattern-driven under the torque feedback control. In the figures described below, the current feedback control is represented as "CURRENT FB", and the torque feedback control is represented as "TORQUE FB".

Figure 5:
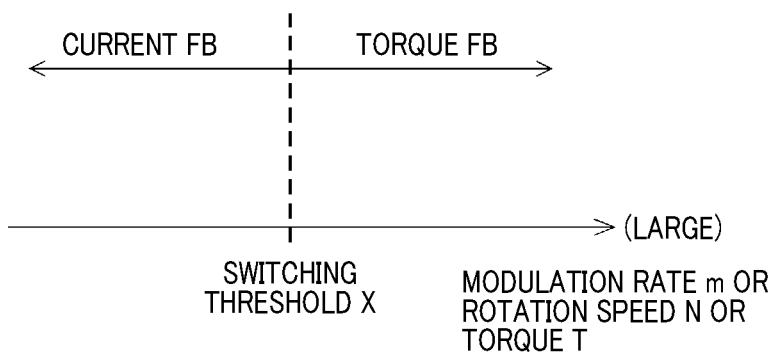
FIG. 5 is a diagram illustrating feedback control switching based on a modulation rate, a rotation speed, and a torque.
Figure 6A:
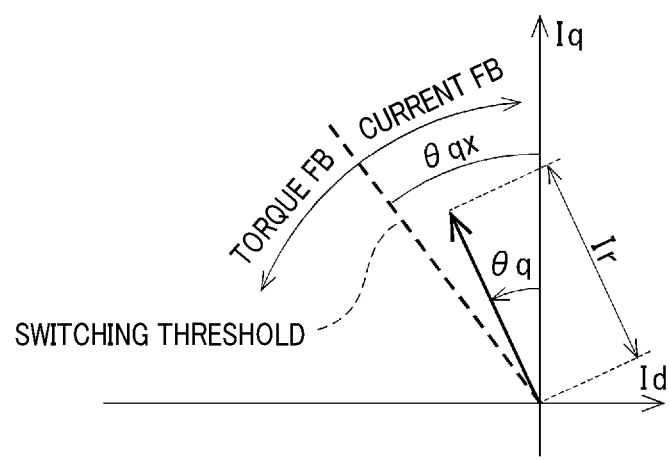
FIG. 6A is a diagram illustrating feedback control switching based on a current phase in dq coordinates.
Figure 6B:
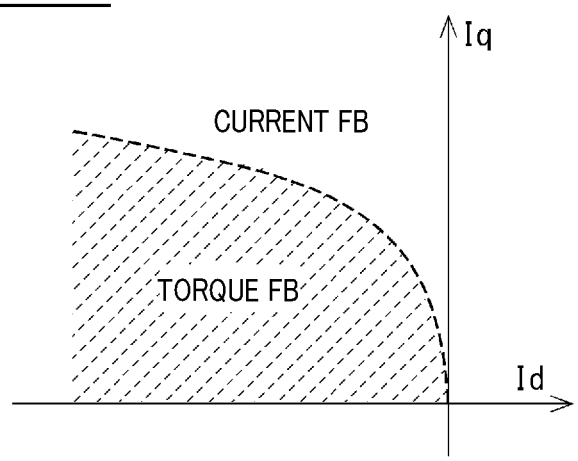
FIG. 6B is a diagram illustrating feedback control switching based on a current range in the dq coordinates.
Figure 6C:
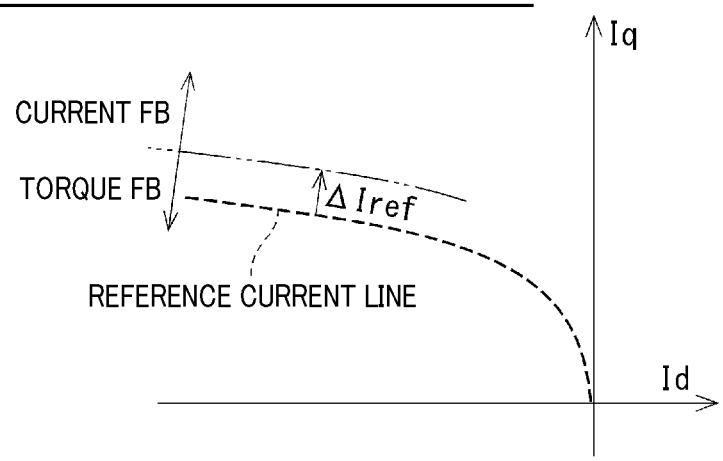
FIG. 6C is a diagram illustrating feedback control switching based on a deviation from a reference current line in the dq coordinates.

FIGS. 5 to 6C illustrate examples of the switching determination amount used for switching between the current feedback control and the torque feedback control. The current feedback control and the torque feedback control may be generalized as two types of feedback control modes for feeding back different amounts of control, for example, a "control mode I" and a "control mode II".

In an example illustrated in FIG. 5, regions for the respective types of feedback control are set using the modulation rate m, the rotation speed N or torque T of the MG 80 as the amounts of switching determination. The switching thresholds for the respective amounts of switching determination are collectively denoted as X. For example, when the modulation rate m, the rotation speed N, or the torque is lower than the corresponding switching threshold X, the current feedback control is selected. Furthermore, when the modulation rate m, the rotation speed N, or the torque is higher than the corresponding switching threshold X, the torque feedback control is selected.

In an example illustrated in FIG. 6A, the phase θq of a dq-axis current vector of a current flowing through the MG 80 is used as the switching determination amount. The current vectors may be the current commands Id*, Iq* or the detected or estimated currents Id, Iq. The current phase θq represents a current phase defined counterclockwise based on the q axis. For example, the current phase θq smaller than a switching threshold θqx leads to selection of the current feedback control, and the current phase θq larger than the switching threshold θqx leads to selection of the torque feedback control. A current phase Ir is referred to in the fourth embodiment. Furthermore, as illustrated in FIG. 6B, switching between the current feedback control and the torque feedback control may be performed depending on the range of the current vector on dq coordinates. Alternatively, as illustrated in FIG. 6C, the magnitude of a current deviation ΔIref from a reference current line specified on the dq coordinates may be used as the switching determination amount.

As described above, the feedback control switching unit 62 in the first and second embodiments switches between the current feedback control and the torque feedback control based on the magnitude relationship between one or more amounts of switching determination and the switching thresholds to drive the MG 80. In a case where a plurality of amounts of switching determination are used, a method for determining, for example, which type of feedback control is given priority may be determined as appropriate when the feedback control selected based on each switching determination amount is different.

In the related art in PTL 1 (Japanese Patent No. 5297953), sine wave PWM control used as a first control mode is selected when required torque responsiveness is high, whereas rectangular wave voltage control used as a second control mode is selected when the required torque responsiveness is not high. In this related art, the rectangular wave voltage control is advantageous for reducing power loss but has low torque responsiveness. In a state in which priority is given to high torque responsiveness over a reduction in power loss, the rectangular wave voltage control is switched to the sine wave PWM control mode.

However, as described below, even though each of the plurality of control modes satisfies high torque responsiveness, frequent switching of the control mode makes the torque responsiveness significantly lower than the responsiveness in each control mode. PTL 1 makes no reference to a decrease in torque responsiveness associated with such switching of the control mode. Furthermore, the related art in PTL 1 is premised on a system including a boost converter and is not applicable to a system including no boost converter.

Figure 7:
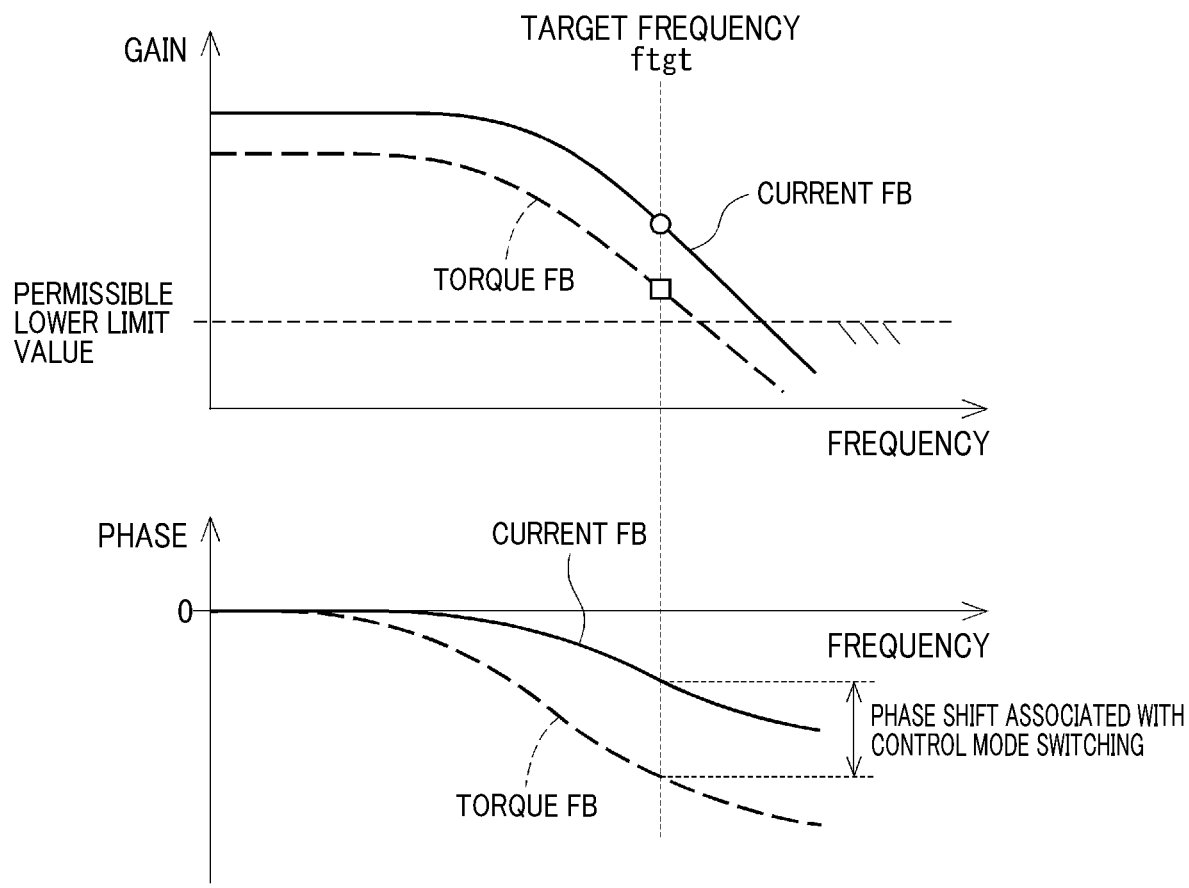
FIG. 7 is a diagram of torque frequency response characteristics under current/torque feedback control.

For a decrease in torque responsiveness associated with frequent switching of the control mode, refer to FIG. 7 and FIG. 8. FIG. 7 illustrates frequency response characteristics vs. a torque frequency under the current feedback control and under the torque feedback control. Compared to the current feedback control, the torque feedback control tends to involve a lower gain at the same frequency and a delayed phase.

However, as illustrated by a circular mark and a square mark, gains of the current feedback control and the torque feedback control at a target frequency ftgt are larger than or equal to a permissible lower limit value and thus satisfy the requirement. Furthermore, the absolute value of phase delay in each type of feedback control is insignificant. Focus is placed on a phase shift between the current feedback control and the torque feedback control at the target frequency ftgt. In other words, an offset corresponding to the phase shift occurs each time the control mode is switched.

An upper portion and a middle portion of FIG. 8 illustrate torque commands and response waveforms under the current feedback control and the torque feedback control. In the torque feedback control, the amplitude of a response to the torque command attenuates and a longer phase delay occurs than in the current feedback control. A torque response resulting from alternative switching between the current feedback control and the torque feedback control deviates significantly from the waveform of the torque command as illustrated by a thick line in a lower portion. Accordingly, frequent switching between current feedback control and torque feedback control makes the torque responsiveness significantly lower than the responsiveness in each control mode.

TReferring again to FIG. 3, the modulator 601 in the first to third embodiments includes the torque response request determining unit 68 determining the degree of the torque responsiveness required for the MG 80. The degree of the torque responsiveness required for the MG 80 is determined from a viewpoint such as whether a user can easily sense vibration of the vehicle caused by a fluctuation in the torque of the MG 80 as described in a paragraph [0062] in PTL 1. For example, rapid repetition of pressing and release of the accelerator leads to a significant fluctuation in the torque command, increasing the degree of the required torque responsiveness.

The torque response request determining unit 68 acquires, for example, information about the frequency of the torque command Trq* and the angular acceleration or the fluctuation in rotation speed of the MG 80 from other functional units in the MG control device 10. For example, when the vehicle travels on a wavelike road or the like, a fluctuation in rotation speed increases the frequency of the torque command Trq*. In such a scene, high torque responsiveness is required. Furthermore, the torque response request determining unit 68 acquires, from the vehicle control device 69 of the vehicle system 90, information indicating that vibration control or engine start has been requested. During vibration control or engine start, high torque responsiveness is required for suppressing vibration. The torque response request determining unit 68 determines, based on one or more of these pieces of information, the degree of the torque responsiveness required for the MG 80.

When the torque response request determining unit 68 determines that the required torque responsiveness is high, the feedback control switching unit 62 reduces the number of executions of switching among the feedback control modes with respect to normal conditions. In other words, when the required torque responsiveness is determined to be high, the feedback control switching unit 62 sets the number of operations of switching of the feedback control during a given period smaller than in the normal conditions.

Now, a specific method for reducing the number of executions of switching for the feedback control will be described in the order of the first embodiment and the second embodiment. A process of reducing the number of executions of switching in the first embodiment will be described with reference to FIGS. 9 to 14. As illustrated in FIG. 9, the first embodiment is premised on a configuration with hysteresis for switching of the feedback control. The switching thresholds for an increase in the switching determination amount are hereinafter collectively referred to as a "first switching threshold". The switching thresholds for a decrease in the switching determination amount are hereinafter collectively referred to as a "second switching threshold". In the configuration with the hysteresis for switching, the first switching threshold, indicated by an alternate long and short dash line, is set larger than the second switching threshold, indicated by an alternate long and two short dashes line. Furthermore, a difference between the first switching threshold and the second switching threshold is referred to as a "hysteresis width". In general, providing hysteresis for the control switching allows hunting to be prevented.

In the N-T characteristic diagram in FIG. 9 in which the modulation rate m is used as the switching determination amount for the feedback control, "L" or "H" at the tail of the switching threshold mx for the modulation rate m are temporarily neglected. A first switching threshold mx_1 for switching from the current feedback control to the torque feedback control in a case of an increase in modulation rate m is set larger than a second switching threshold mx_2 for switching from the torque feedback control to the current feedback control in a case of an decrease in modulation rate m.

Figure 10:
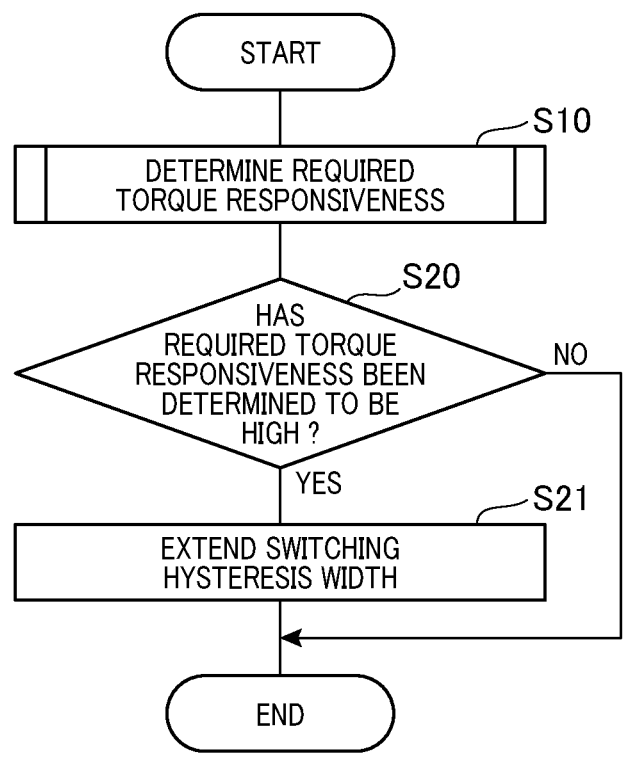
FIG. 10 is a flowchart of a process of reducing the number of executions of switching according to the first embodiment.
Figure 11:
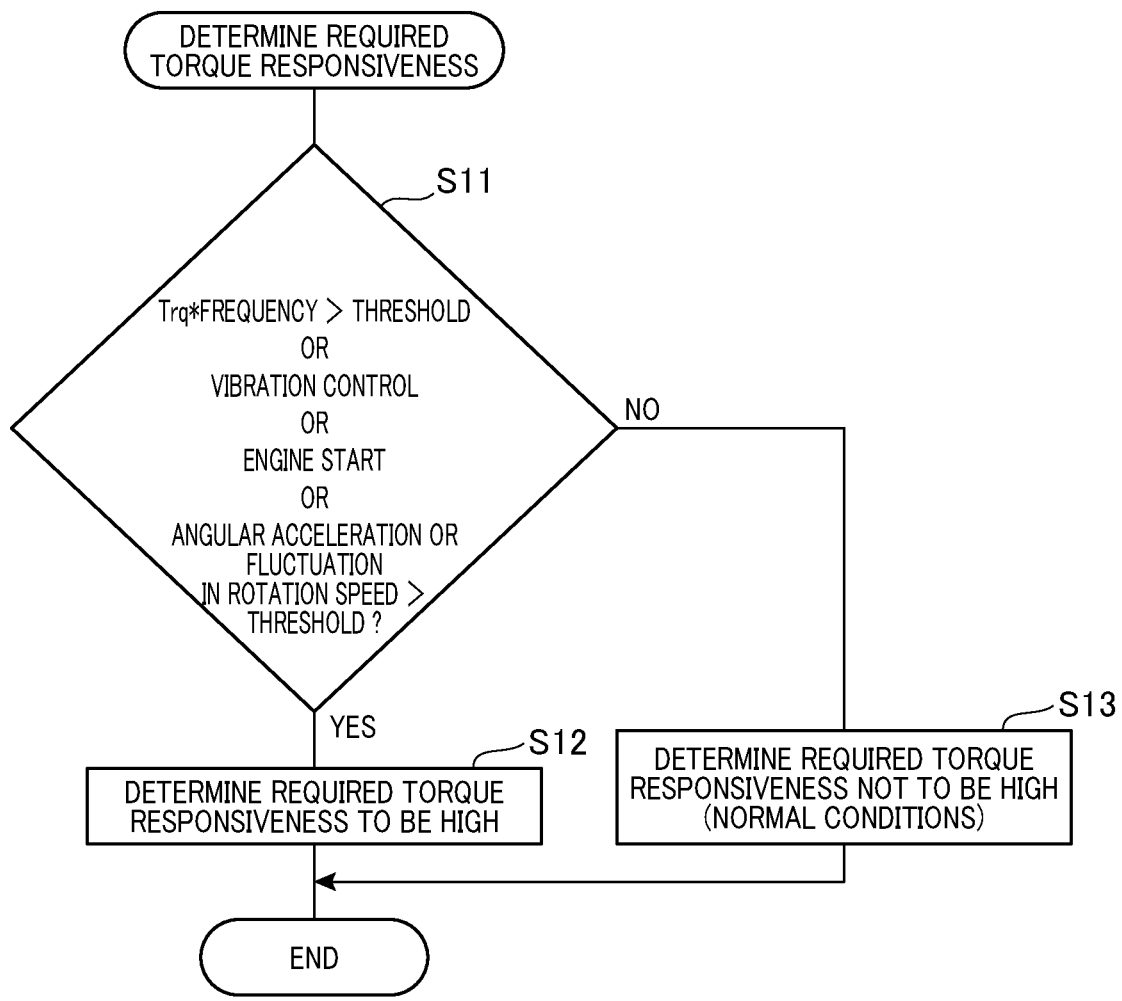
FIG. 11 is a sub-flowchart illustrating an example of required torque responsiveness determination.

FIG. 10 and FIG. 11 illustrate flowcharts of the process of reducing the number of executions of switching according to the first embodiment. A reference character "S" in the description of the flowcharts means a step. In S10, a required torque responsiveness determining process is executed. In a sub-flowchart of a required torque responsiveness determining process illustrated in FIG. 11, whether any one or more of the following conditions are satisfied is determined in S11.

(1) The frequency of the torque command Trq* is higher than a frequency threshold. The frequency threshold is determined, for example, by the engine rotation speed, a torsional frequency of an axle, or the like.

(2) The vehicle system 100 requires vibration control.

(3) The vehicle system 100 requires engine start.

(4) The angular acceleration of the MG 80 is larger than an angular acceleration threshold, or a fluctuation in rotation speed determined from an amplitude or period of the fluctuation in rotation speed is larger than a fluctuation threshold.

When any one or more of the conditions (1) to (4) are satisfied, the determination in S11 is YES, and the process leads to the determination in S12 that the "required torque responsiveness is high". On the other hand, when none of the above-described conditions are satisfied, the determination in S11 is NO, and the process leads to the determination in S13 that the "required torque responsiveness is not high", that is, the determination of the normal conditions. FIG. 10 is referred to again. When the required torque responsiveness determining process leads to the determination that the "required torque responsiveness is high", the determination in S20 is YES, and the feedback control switching unit 62 sets, in S21, the switching hysteresis width larger than in the normal conditions.

Figure 12:
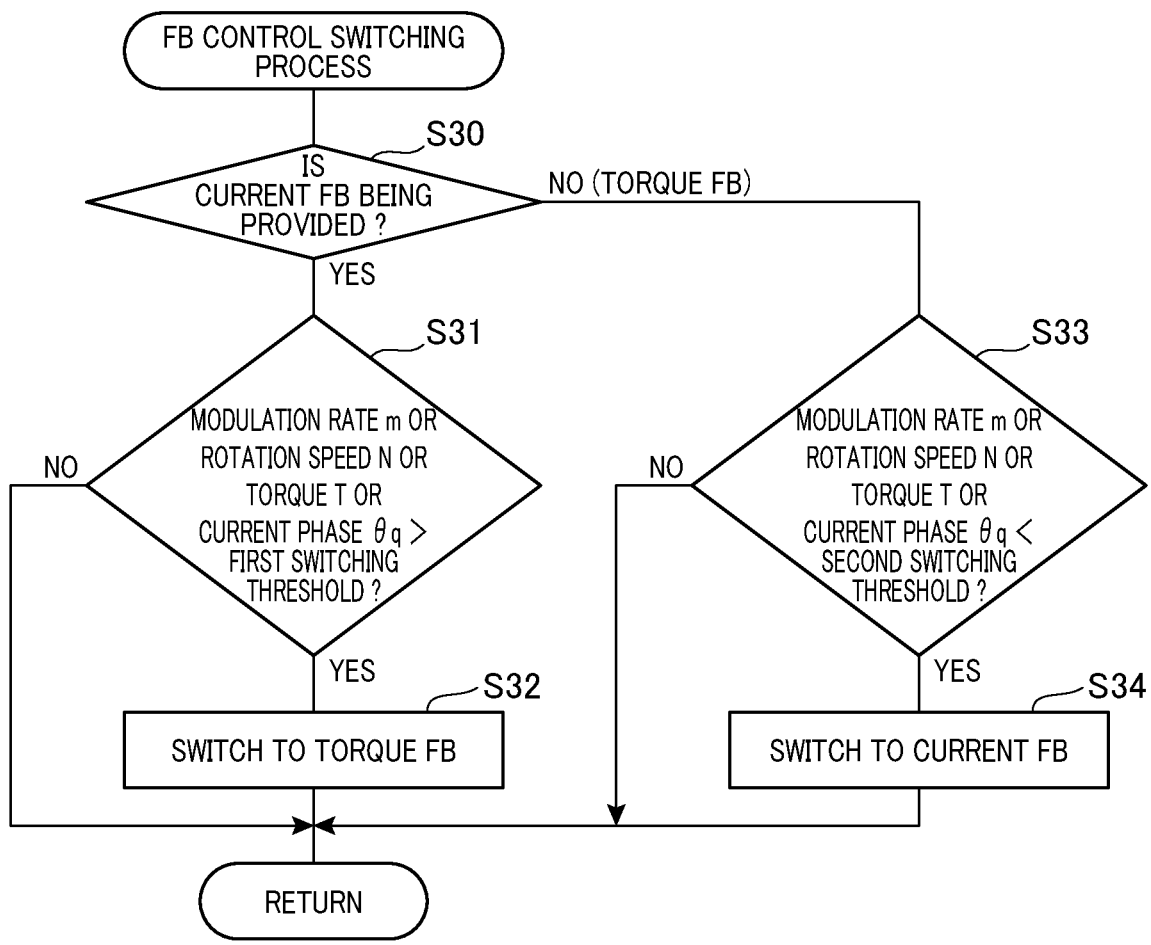
FIG. 12 is a flowchart illustrating an example of feedback control switching.

Now, an example of an increase in hysteresis width for feedback control switching based on a specific switching determination amount will be described with reference to FIG. 9 and FIGS. 12 to 14. FIG. 12 illustrates an example of a flowchart of feedback control switching in a configuration with hysteresis. In S30, whether the current feedback control is being provided is determined. In a case of the current feedback control, the determination in S30 is YES, and the process shifts to S31. In a case of the torque feedback control, the determination in S30 is NO, and the process shifts to S33.

In S31, whether the modulation rate m, the rotation speed N, the torque T, or current phase θq is higher than the corresponding first switching threshold is determined. In a case where the determination in S31 is YES, the feedback control switching unit 62 switches, in S32, from the current feedback control to the torque feedback control. In S33, whether the modulation rate m, the rotation speed N, the torque T, or current phase θq is lower than the corresponding second switching threshold is determined. In a case where the determination in S33 is YES, the feedback control switching unit 62 switches, in S34, from the torque feedback control to the current feedback control. In a case where the determination in S31 or S33 is NO, the current feedback control is maintained.

A configuration with such hysteresis is a prerequisite, and FIG. 9, FIG. 13, and FIG. 14 illustrate the hysteresis in the normal conditions and in a case where the required torque responsiveness is high. An upper portion of each figure shows the first and second switching thresholds in the normal conditions. A lower portion of each figure shows the first and second switching thresholds in a case where the required torque responsiveness is high. In all the figures, "L" is provided at the tail of each of the reference signs for the switching thresholds in the normal conditions, and "H" is provided at the tail of each of the reference signs for the switching thresholds in the case where the required torque responsiveness is high. Furthermore, "α" denotes the hysteresis width in the normal conditions, and "β" denotes the hysteresis width in the case where the required torque responsiveness is high. The signs "α" and "β" for the hysteresis width mean independent values for each switching determination amount in each figure and are assumed to have no relation between different figures.

In the N-T characteristic diagram in FIG. 9, in the normal conditions, the hysteresis width α corresponds to a difference between a first switching threshold mx_1L and a second switching threshold mx_2L. In the case where the required torque responsiveness is high, the hysteresis width β corresponds to a difference between a first switching threshold mx_1H and a second switching threshold mx_2H. For the modulation rate m used as the switching determination amount, the hysteresis width β in the case where the required torque responsiveness is high, is larger than the hysteresis width α in the normal conditions.

Here, it is possible to, in the case where the required torque responsiveness is high, set the first switching threshold mx_1H larger than the switching threshold mx_1L in the normal conditions, while set the second switching threshold mx_2H smaller than the switching threshold mx_2L in the normal conditions, increasing the hysteresis width on both sides. Alternatively, it is possible to, in the case where the required torque responsiveness is high, extend only the first or second switching threshold outward, increasing the hysteresis width on one side. This also applies to FIG. 13 and FIG. 14.

Preferably, for optimizing losses, the hysteresis width α in the normal conditions is set as small as possible to the extent that the setting does not cause control switching hunting. Furthermore, for example, for provision of vibration control, the hysteresis width β in the case where the required torque responsiveness is high is set as large as possible based on a torque amplitude required for the vibration control and a modulation rate-torque characteristic determined by MG characteristics. That is, the first switching threshold mx_1H used as an upper limit value for the current feedback control is set based on an upper limit modulation rate for sine wave driving. The second switching threshold mx_2H used as a lower limit value for the torque feedback control is set based on the maximum fluctuation amplitude of the torque permitted in the vibration control.

In FIG. 13, for all of the modulation rate m, the rotation speed N, and the torque T each used as the switching determination amount, the first switching threshold in the normal conditions is denoted as X_1L, and the second switching threshold in the normal conditions is denoted as X_2L. The first switching threshold in the case where the required torque responsiveness is high is denoted as X_1H, and the second switching threshold in the case where the required torque responsiveness is high is denoted as X_2H. Regardless of whichever switching determination amount is used, the hysteresis width in the case where the required torque responsiveness is high is larger than the hysteresis width α in the normal conditions.

In FIG. 14, for the q-axis reference current phase θq used as the switching determination amount, the first switching threshold in the normal conditions is denoted as θqx_1L, and the second switching threshold in the normal conditions is denoted as θqx_2L. The first switching threshold in the case where the required torque responsiveness is high is denoted as θqx_1H, and the second switching threshold in the case where the required torque responsiveness is high is denoted as θqx_2H. The hysteresis width β of the current phase θq in the case where the required torque responsiveness is high is larger than the hysteresis width α in the normal conditions.

As described above, in the first embodiment, when the required torque responsiveness is determined to be high, a decrease in torque responsiveness associated with switching of the feedback control can be suppressed by setting the hysteresis width larger than in the normal conditions to reduce the number of executions of switching for the feedback control. Accordingly, the torque responsiveness can be improved. Furthermore, unlike in the related art in PTL 1, the MG control device 10 in the first embodiment is applicable to a system including no boost converter.

Second Embodiment

Figure 15:
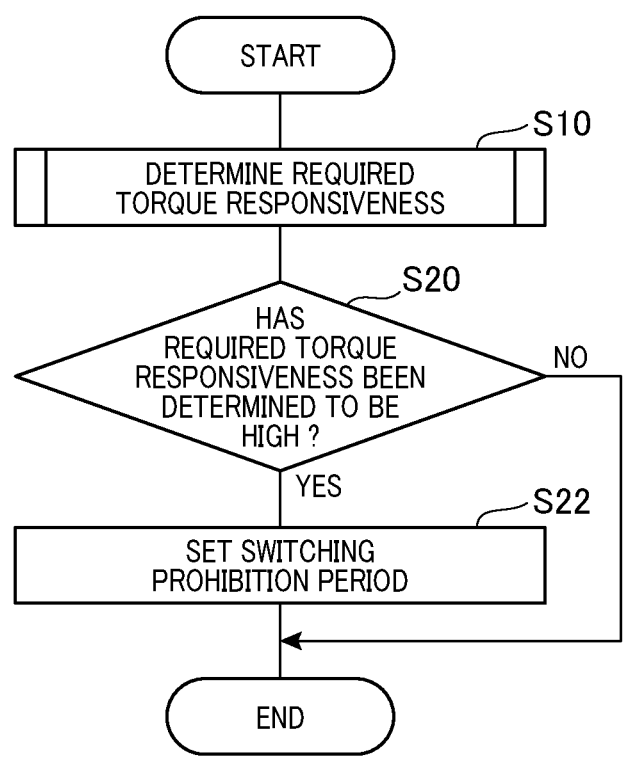
FIG. 15 is a flowchart of a process of reducing the number of executions of switching according to the second embodiment.

A second embodiment will be described with reference to FIG. 15 and FIG. 16. FIG. 15 is a flowchart of the process of reducing the number of executions of switching corresponding to FIG. 10 for the first embodiment, and shares the sub-flowchart of the required torque responsiveness determination in FIG. 11. FIG. 15 differs from FIG. 10 in that, when the required torque responsiveness is determined to be high in S20, a switching prohibition period is set in S22 in FIG. 15, whereas the hysteresis width is increased in S21 in FIG. 10. That is, in the second embodiment, one switching among the feedback control modes 1 is executed, and thereafter the next execution of switching among the feedback control modes is prohibited for a predetermined switching prohibition period to reduce the number of executions of switching.

Figure 16:
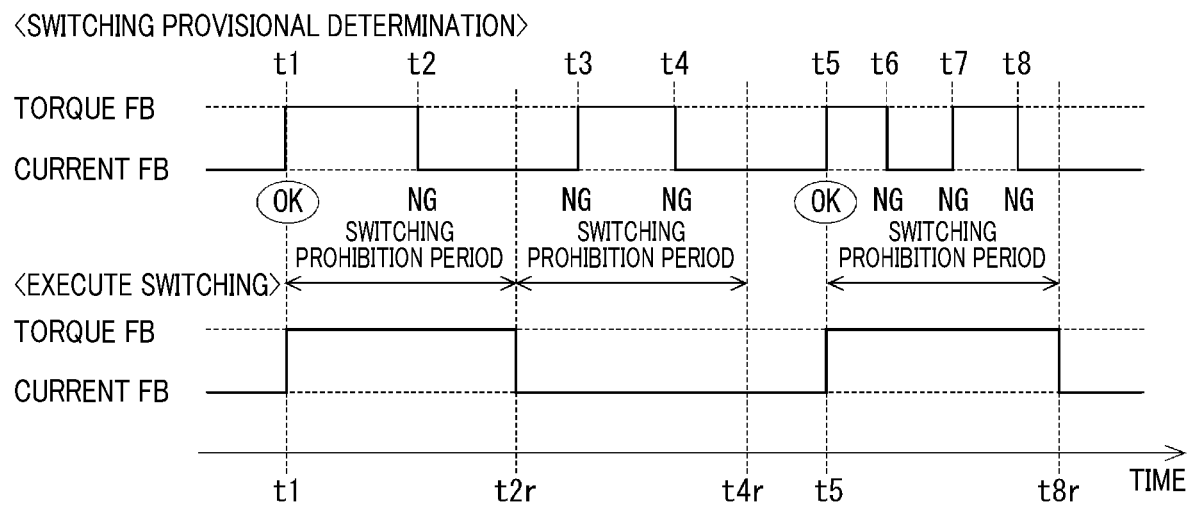
FIG. 16 is a time chart illustrating a switching prohibition period according to the second embodiment.

A time chart in FIG. 16 indicates an example of a relationship between a switching execution timing and a timing for switching provisional determination made by the feedback control switching unit 62. As is the case with the first embodiment, the switching provisional determination is made based on the magnitude relationship between the switching threshold for each switching determination amount and the switching determination amount such as the modulation rate m, the rotation speed N, the torque T, or the current phase θq. The switching hysteresis need not be provided. In a case where the feedback control is switched at a certain timing for the switching provisional determination, the switching prohibition period is started at that point in time. Even in a case where the next switching provisional determination is made during the switching prohibition period, switching of the feedback control is prohibited and is not executed. In an example in FIG. 16, among points in time t1 to t8 for switching provisional determination, timings when switching is executed are denoted as "OK", and timings when the switching is prohibited are denoted as "NG".

First, at time t1, the current feedback control is switched to the torque feedback control. Subsequently, at time t2, switching from the torque feedback control to the current feedback control is provisionally determined, but since time t2 is within the switching prohibition period starting at time t1, switching is not executed. At time t2r when the switching prohibition period ends, the torque feedback control is switched to the current feedback control. Then, switching from the current feedback control to the torque feedback control is provisionally determined, and switching from the current feedback control to the torque feedback control is provisionally determined at time t3 and t4 which is within the switching prohibition period starting at time t2r, but no switching is executed. Subsequently, at time t4r when the switching prohibition period starting at time t2r ends, the current feedback control is maintained in accordance with the switching provisional determination at the latest point in time t4.

Then, at time t5, when switching from the current feedback control to the torque feedback control is provisionally determined, switching is executed. Subsequently, in response to the switching provisional determinations at the points in time t6, t7, and t8 during the switching prohibition period starting at time t5, no switching is executed. At time t8r when the switching prohibition period starting at time t5 ends, the torque feedback control is switched to the current feedback control in accordance with the switching provisional determination at the latest time t8.

In this manner, in the example in FIG. 16, four of the eight provisionally determined switching operations are not performed, and only the remaining four switching operations are performed, during the period from time t1 to time t8. Accordingly, when the required torque responsiveness is determined to be high, the number of executions of switching for the feedback control can be reduced, allowing the torque responsiveness to be improved.

Third Embodiment

Figure 4:
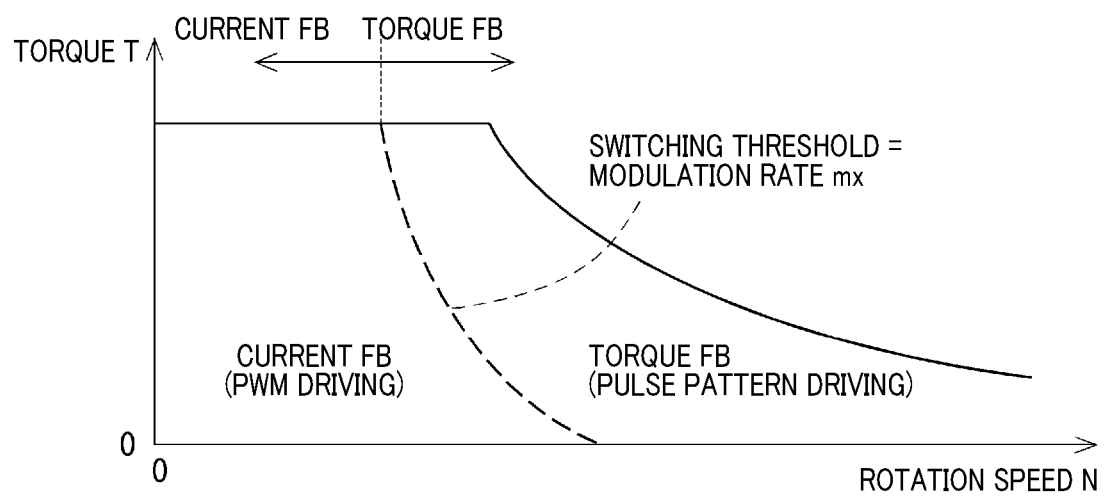
FIG. 4 is an N-T characteristic diagram illustrating feedback control switching in two modes according to the first and second embodiments.
Figure 17:
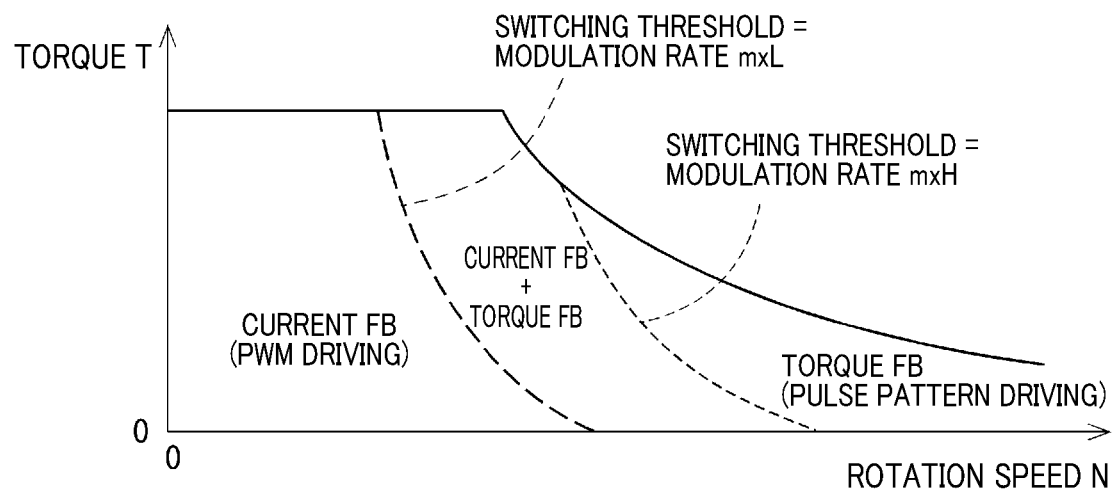
FIG. 17 is an N-T characteristic diagram illustrating feedback control switching in three modes according to the third embodiment.

A third embodiment will be described with reference to FIG. 17. FIG. 17 is an N-T characteristic diagram corresponding to FIG. 4, and the "torque FB" region in FIG. 4 is further separated into a "current FB+torque FB" region and a "torque FB" region. In the "current FB+torque FB" region, the voltage amplitude Vr calculated by the controller 57 of the current feedback control unit 580 and the current phase φ calculated by the torque feedback control unit 540 are output to the modulator 60. The switching command generating unit 65 of the modulator 60 generates a switching command under overmodulation PWM control or pulse pattern control based on the voltage amplitude Vr and the voltage phase φ.

In the third embodiment, selection from three feedback control schemes is performed: (1) only the current feedback control unit 580, (2) both the current feedback control unit 580 and the torque feedback control unit 540, and (3) only the torque feedback control unit 540. In FIG. 17, control mode switching between "current FB" and "current FB+torque FB" is referred to as "low-rotation-speed switching". Control mode switching between "current FB+torque FB" and "torque FB" is referred to as "high-rotation-speed switching". The low-rotation-speed switching is performed using the modulation rate mxL as a switching determination threshold. The high-rotation-speed switching is performed using, as a switching determination threshold, a modulation rate mxH higher than a modulation rate mxL.

When the torque response request determining unit 68 determines that the required torque responsiveness is high, the number of executions of switching may be reduced by increasing the hysteresis width, setting the switching prohibition period, or the like for both low-rotation-speed switching and high-rotation-speed switching. Alternatively, the feedback control switching unit 62 may reduce, for one of the low-rotation-speed switching and the high-rotation-speed switching, the number of executions of switching by increasing the hysteresis width, or setting the switching prohibition period, or the like, while setting, for the other switching, the number of executions of switching similar to the number of executions of switching in the normal conditions. Thus, in the third embodiment, effects similar to the effects of the first and second embodiments are obtained.

Fourth Embodiment

Figure 18:
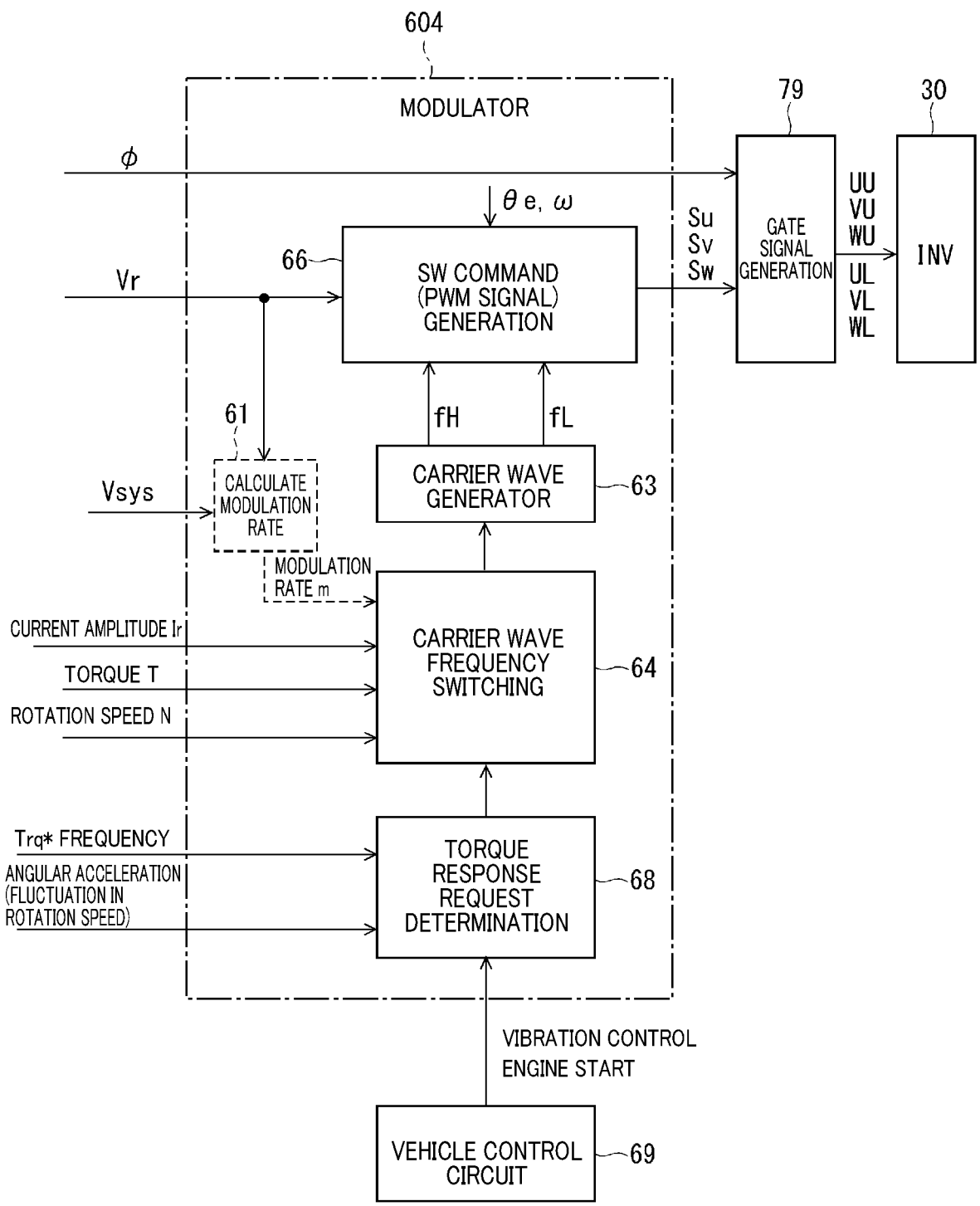
FIG. 18 is a control block diagram of a modulator according to a fourth embodiment.

A fourth embodiment will be described with reference to FIGS. 18 to 20. FIG. 18 is a block diagram of a modulator corresponding to FIG. 3. FIG. 20 is a flowchart corresponding to FIG. 11. An MG control device in the fourth embodiment is premised on a control configuration in which the MG 80 is driven by PWM control, and reduce the number of executions of switching of a carrier wave frequency for the PWM control when the required torque responsiveness is high.

As illustrated in FIG. 18, the modulator 604 in the fourth embodiment includes the carrier wave generator 63, the carrier wave frequency switching unit 64, the switching command generating unit 66, and the torque response request determining unit 68. The voltage amplitude Vr and the voltage phase φ calculated by the current feedback control unit 580 are input to the modulator 604. The carrier wave generator 63 can generate a plurality of carrier waves with different frequencies. Frequencies fH and fL in FIG. 18 are different frequencies. Here, fH and fL are relatively assumed to be a high frequency and a low frequency, respectively.

The carrier wave frequency switching unit 64 switches the carrier wave frequencies fH, fL generated by the carrier wave generator 63 based on the magnitude relationship between a predetermined switching determination amount and a switching determination threshold. As the switching determination amount, for example, current amplitude Ir, the torque T, the rotation speed N, or the like is used. Besides the amplitude Ir of the dq-axis current vector illustrated in FIG. 6(a), an amplitude or an effective value of a phase current may be used as the current amplitude. Furthermore, as illustrated by a dash line, the switching determination amount may be the modulation rate m calculated by the modulation rate calculating unit 61 from a ratio between the voltage amplitude Vr and the system voltage Vsys. The switching command generating unit 66 provides PWM control in which the command voltage is compared with the carrier wave generated by the carrier wave generator 63, to generate a switching command for the inverter 30.

Figure 3:
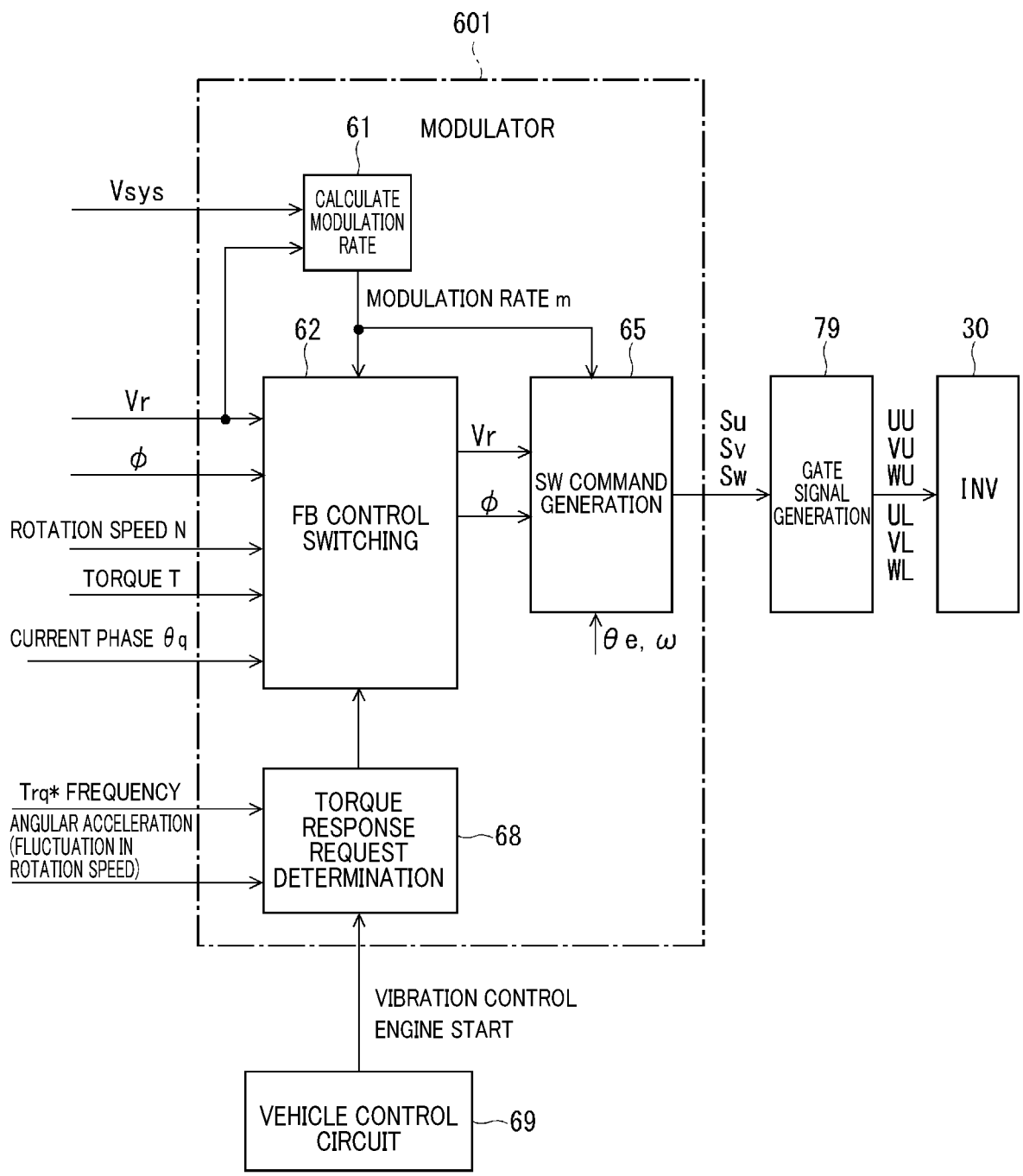
FIG. 3 is a control block diagram of a modulator according to a first to a third embodiments.

The torque response request determining unit 68 is configured as is the case with the first to third embodiments in FIG. 3 to determine the degree of the torque responsiveness required for the MG 80. When the torque response request determining unit 68 determines the required torque responsiveness to be high, the carrier wave frequency switching unit 64 reduces the number of executions of switching for the carrier wave frequency. The configuration for a reducing the number of executions of switching may be a configuration for an increase in hysteresis width as in the case of the first embodiment or a configuration for provision of a switching prohibition period as in the case of the second embodiment. Flowcharts of a process of reducing the number of executions of switching executed by the respective configurations correspond to FIG. 10 and FIG. 15. Furthermore, a sub-flowchart of required torque responsiveness determination corresponds to FIG. 11.

The meaning of switching of the carrier wave frequency for PWM control will be described with reference to FIG. 19. An upper portion of FIG. 19 shows a switching command signal during one electrical cycle in a case where the carrier wave frequency is relatively low. A lower portion of FIG. 19 shows a switching command signal during one electrical cycle in a case where the carrier wave frequency is relatively high. The switching command signal is turned on when the command voltage is higher than the carrier wave, and is turned off when the command voltage is lower than the carrier wave. Accordingly, the number of switching operations during one electrical cycle increases with carrier wave frequency.

A large number of switching operations of switching elements during one electrical cycle improves controllability, while increasing switching loss due to heat from the switching elements. Thus, when the current amplitude Ir or the torque T is relatively high, it is required to reduce the carrier wave frequency to decrease the number of switching operations in terms of heat requirements, i.e., overheat protection of elements. This also applies to the modulation rate m correlated with the torque T. On the other hand, when the current amplitude Ir or the torque T is relatively low, the carrier wave frequency is preferably increased to increase the number of switching operations in order to ensure controllability. Besides, the carrier wave frequency may be switched according to the number of pulses during one electrical cycle depending on the rotation speed N.

FIG. 20 illustrates a diagram corresponding to FIG. 13 for the first embodiment, for a configuration for reducing the number of executions of switching for the carrier wave frequency by increasing the hysteresis width. In FIG. 20, for the current amplitude Ir or the torque T used as the switching determination amount, the first switching threshold in the normal conditions is denoted by $X\_1L$, the second switching threshold in the normal conditions is denoted by $X\_2L$, and the first switching threshold in the case where the required torque responsiveness is high is denoted by $X\_1H$, the second switching threshold in the case where the required torque responsiveness is high is denoted by $X\_2H$.

When the carrier wave frequency is now the high frequency fH, the current amplitude Ir or the torque T is increased and become higher than the first switching thresholds $X\_1L$, $X\_1H$, the carrier wave frequency switching unit 64 switches the carrier wave frequency from the high frequency fH to the low frequency fL. When the carrier wave frequency is now the low frequency fL, the current amplitude Ir or the torque T is reduced and becomes lower than the second switching thresholds $X\_1L$, $X\_2H$, the carrier wave frequency switching unit 64 switches the carrier wave frequency from the low frequency fL to the high frequency fH. Thus, in the configuration with the hysteresis for switching of the carrier wave frequency, the hysteresis width β in the case where the required torque responsiveness is high is larger than the hysteresis width a in the normal conditions.

Furthermore, for a time chart of the configuration for providing a switching prohibition period to reduce the number of executions of switching for the carrier wave frequency, the "torque FB" and the "current FB" may be simply replaced with the "high frequency fH" and the "low frequency fL". Thus, an exclusive drawing is omitted. To ensure continuity of the output voltage waveform during switching of the carrier wave frequency, the switching timing may be adjusted.

Thus, in the fourth embodiment, for switching of the carrier wave frequency for PWM control, the number of executions of switching is reduced when the required torque responsiveness is high. Thus, as is the case with the first and second embodiments for switching of the feedback control, a decrease in torque responsiveness associated with switching of the carrier wave frequency can be suppressed, allowing the torque responsiveness to be improved.

Other Embodiments (a) The plurality of feedback control units to be switched are not limited to the current feedback control unit and the torque feedback control unit illustrated in the first to third embodiments, but may be feedback control units feeding back other amounts of control, for example, the voltage or the rotation speed, or the like. Three or more feedback control units may be switched. Furthermore, compared to the fourth embodiment switching between the two carrier wave frequencies, the other embodiments may switch among three or more carrier wave frequencies.

(b) In the determination of the required torque responsiveness, the present disclosure is not limited to the embodiment in which the required torque responsiveness is divided into two levels: "high/not high". The required torque responsiveness may be divided into three levels or more, and the hysteresis width may correspondingly be extended in multiple stages, or the lengths of the switching prohibition period may be set in multiple stages. In other words, the hysteresis width or the length of the switching prohibition period may be set to increase consistently with the level of the required torque responsiveness.

(c) As a means for reducing the number of executions of switching, the extension of the hysteresis width and the setting of the switching prohibition period may be combined.

(d) As the switching determination amount, amounts other than those illustrated in the embodiments may be used. Furthermore, in the comparison with the switching threshold, comparison of the absolute value, square value, or the like of the switching determination amount with the switching threshold may be performed instead of or in addition to the simple comparison for the magnitude relationship.

(e) In the determination of the required torque responsiveness, determination conditions other than those illustrated in the embodiments may be used.

(f) The control device for the AC motor according to the present disclosure may be applied to a vehicle system for an electric car instead of the hybrid car. However, for the vehicle system for the electric car, the engine start is excluded from the determination conditions for the required torque responsiveness determining process. Furthermore, the control device for the AC motor according to the present disclosure may be applied to driving systems for AC motors for any applications such as for general machines other than the vehicle system. However, for applications other than the vehicles, the vibration control and the engine start are excluded from the determination conditions for the required torque responsiveness determining process.

(g) The number of phases of the AC motor driven in the system to which the present disclosure is applied is not limited to three. Any number of phases may be used. Furthermore, the AC motor is not limited to the permanent-magnet-type synchronous motor but may be an induction motor or any other synchronous motor.

The present disclosure is not limited to the above-described embodiments, and may be implemented in various embodiments without departing from the spirits of the disclosure.

The present disclosure has been described in compliance with the embodiments. However, the present disclosure is not limited to the embodiments and structures. The present disclosure includes various modifications and variations within the range of equivalency. Furthermore, the scope of the present disclosure or the range of ideas includes various combinations or forms and other combinations or forms including one additional element or two or more additional elements or a part of one element.

The invention claimed is:

1. A control device for an AC motor, the control device comprising:
   an inverter that includes a plurality of switching elements that convert DC power input from a power supply into AC power and supply the AC power to the AC motor;
   a plurality of feedback control units that respectively perform feedback control modes that respectively use feedback of different controlled variables for driving of the AC motor;
   a feedback control switching unit that selects, based on a magnitude relationship between a predetermined switching determination amount and at least one switching threshold, at least one of the feedback control units to thereby execute switching among the feedback control modes of the respective feedback control units for driving of the AC motor;
   a switching command generating unit that generates a switching command for the inverter based on a manipulated variable calculated by the selected feedback control unit; and
   a torque response request determining unit that determines a degree of torque responsiveness required for the AC motor,
   wherein, when the torque response request determining unit determines that the required torque responsiveness is high, the feedback control switching unit reduces the number of executions of switching among the feedback control modes.

2. The control device according to claim 1, wherein the plurality of feedback control units include:
   a current feedback control unit (580) that calculates an output voltage from the inverter as the manipulated variable of the corresponding feedback control modes for a current flowing through the AC motor; and
   a torque feedback control unit (540) that calculates a phase of an output voltage from the inverter as the manipulated variable of the corresponding feedback control mode for torque output from the AC motor, and
   the feedback control switching unit selects one or both of the current feedback control unit and the torque feedback control unit.

3. The control device according to claim 1, wherein
   the at least one switching threshold includes a first switching threshold used for an increase of the switching determination amount, and a second switching threshold used for a decrease of the switching determination amount;
   the first and second switching thresholds have a hysteresis such that the first switching threshold is set to be higher than the second switching threshold; and
   when the torque response request determining unit determines that the required torque responsiveness is high, the feedback control switching unit extends a hysteresis width that is a difference between the first switching threshold and the second switching threshold.

4. The control device according to claim 1, wherein
   when the torque response request determining unit determines that the required torque responsiveness is high, the feedback control switching unit executes one switching among the feedback control modes, and thereafter prohibits next execution of switching among the feedback control modes for a predetermined switching prohibition period.

5. The control device according to claim 1, wherein, the switching determination amount includes a modulation rate of the inverter.

6. The control device according to claim 1, wherein the switching determination amount includes an amount related to an amplitude or a phase of a current flowing through the AC motor.

7. The control device according to claim 1, wherein the switching determination amount includes a rotation speed of the AC motor or an amount correlated with the rotation speed.

8. The control device according to claim 1, wherein the switching determination amount includes an amount related to torque of the AC motor.

9. The control device according to claim 1, wherein the torque response request determining unit determines that the required torque responsiveness is high when a frequency of a torque command value for the AC motor is higher than a frequency threshold.

10. The control device according to claim 1, wherein:
    the control device is applied to a vehicle system using the AC motor as a power source for a vehicle, and,
    the torque response request determining unit determines that the required torque responsiveness is high when vibration control is requested in the vehicle system.

11. The control device according to claim 1, wherein:
    the control device is applied to a vehicle system for a hybrid vehicle using the AC motor and an engine as power sources thereof, and
    the torque response request determining unit determines that the required torque responsiveness is high when a start of the engine is requested in the vehicle system.

12. The control device according to claim 1, wherein the torque response request determining unit determines that the required torque responsiveness is high when an angular acceleration of the AC motor is larger than an angular acceleration threshold or when a fluctuation in a rotation speed of the AC motor is larger than a fluctuation threshold.

13. A control device for an AC motor, the control device comprising:
    an inverter that includes a plurality of switching elements that convert DC power input from a power supply into AC power and supply the AC power to the AC motor;
    a carrier wave generator for generating a plurality of carrier waves with different frequencies;
    a carrier wave frequency switching unit that executes switching among the frequencies of the respective carrier waves based on a magnitude relationship between a predetermined switching determination amount and a switching threshold;
    a switching command generating unit that performs PWM control to compare the carrier wave generated by the carrier wave generator with a command voltage to thereby generate a switching command for the inverter; and
    a torque response request determining unit that determines a degree of torque responsiveness required for the AC motor,
    wherein, when the torque response request determining unit determines the required torque responsiveness to be high, the carrier wave frequency switching unit reduces the number of executions of switching among the frequencies of the respective carrier waves.

14. The control device according to claim 13, wherein
the at least one switching threshold includes a first switching threshold used for an increase of the switching determination amount, and a second switching threshold used for a decrease of the switching determination amount;
the first and second switching thresholds have a hysteresis such that the first switching threshold is set to be higher than the second switching threshold; and
when the torque response request determining unit determines that the required torque responsiveness is high, the carrier wave frequency switching unit extends a hysteresis width that is a difference between the first switching threshold and the second switching threshold.

15. The control device according to claim 13, wherein
when the torque response request determining unit determines that the required torque responsiveness is high,
the carrier wave frequency switching unit executes one switching among the frequencies of the respective carrier waves, and thereafter prohibits next execution of switching among the frequencies of the respective carrier waves for a predetermined switching prohibition period.

* * * * *